US012704933B2

(12) United States Patent
Mizuhashi et al.

(10) Patent No.: US 12,704,933 B2
(45) Date of Patent: Aug. 11, 2026

(54) METHOD EXECUTED BY SENSOR CONTROLLER OF ELECTROMAGNETIC RESONANCE SYSTEM, SENSOR CONTROLLER, AND POSITION DETECTION DEVICE

(71) Applicant: Wacom Co., Ltd., Saitama (JP)

(72) Inventors: Hiroshi Mizuhashi, Saitama (JP); Akira Ito, Saitama (JP); Yoshihisa Sugiyama, Saitama (JP); Joo Hoon Lee, Saitama (JP)

(73) Assignee: Wacom Co., Ltd., Saitama (JP)

( * ) Notice: Subject to any disclaimer, the term of this patent is extended or adjusted under 35 U.S.C. 154(b) by 0 days.

(21) Appl. No.: 19/241,014

(22) Filed: Jun. 17, 2025

(65) Prior Publication Data

US 2025/0315139 A1 Oct. 9, 2025

Related U.S. Application Data

(63) Continuation of application No. 18/971,950, filed on Dec. 6, 2024, now Pat. No. 12,366,947, which is a
(Continued)

(30) Foreign Application Priority Data

Jun. 6, 2022 (JP) ................................ 2022-091360

(51) Int. Cl.
*G06F 3/046* (2006.01)
*G01D 5/22* (2006.01)
*G06F 3/041* (2006.01)

(52) U.S. Cl.
CPC ........... *G06F 3/046* (2013.01); *G01D 5/2208* (2013.01); *G06F 3/04162* (2019.05); *G06F 3/04164* (2019.05); *G06F 3/04166* (2019.05)

(58) Field of Classification Search
CPC ... G01D 5/2208; G06F 3/04166; G06F 3/046; G06F 3/04164; G06F 3/04162
See application file for complete search history.

(56) References Cited

U.S. PATENT DOCUMENTS 8,982,091 B1 3/2015 Mohindra
2013/0271426 A1* 10/2013 Yumoto ................ G06F 3/0418 345/173

FOREIGN PATENT DOCUMENTS

JP H05143224 A 6/1993
JP 4955116 B1 6/2012
(Continued)

OTHER PUBLICATIONS

International Search Report, dated Aug. 15, 2023, for International Application PCT/JP2023/020407. (4 pages) (with English translation).

*Primary Examiner* — Lisa S Landis
(74) *Attorney, Agent, or Firm* — Seed Intellectual Property Law Group LLP

(57) ABSTRACT

A position detection device includes a plurality of linear electrodes extending in a first direction, a plurality of coils extending in a second direction, and a sensor controller configured to: in a first half of each of pen signal detection periods, send an alternating magnetic field by supplying first and second alternating currents to the plurality of linear electrodes; in a second half of each of the pen signal detection periods, connect a defined number of two or more coils selected from the plurality of coils in connection modes having different connection polarities in the pen signal detection periods and detect a pen signal level result value; and separately acquire the pen signal level for each of the defined number of two or more coils by performing a
(Continued)

restoration operation according to the connection polarities on the result values detected in the pen signal detection periods.

16 Claims, 18 Drawing Sheets

Related U.S. Application Data continuation of application No. PCT/JP2023/020407, filed on Jun. 1, 2023.

(56) References Cited

FOREIGN PATENT DOCUMENTS

| | | | | |
|---|---|---|---|---|
| JP | 6698386 B2 | | 5/2020 | |
| WO | WO-2013117877 A1 | * | 8/2013 | ............. G06F 3/047 |

* cited by examiner

METHOD EXECUTED BY SENSOR CONTROLLER OF ELECTROMAGNETIC RESONANCE SYSTEM, SENSOR CONTROLLER, AND POSITION DETECTION DEVICE

BACKGROUND

Technical Field

The present invention relates to a method executed by a sensor controller of an electromagnetic resonance system, a sensor controller, and a position detection device.

Description of the Related Art

An electromagnetic resonance system (EMR system) is one of the known systems for detecting the position of an electromagnetic induction pen on a panel surface of a tablet terminal or the like. A tablet terminal of the EMR system has a sensor (hereinafter, referred to as an "EMR sensor") arranged in the panel surface to detect a pen, and a sensor controller connected to the EMR sensor. The EMR sensor includes a plurality of Tx coils arranged side by side in a y direction and a plurality of Rx coils arranged side by side in an x direction. The sensor controller detects the position of the electromagnetic induction pen by sequentially sending alternating magnetic fields from the plurality of Tx coils and each time receiving a reflection signal (hereinafter, referred to as a "pen signal") transmitted by the electromagnetic induction pen at each Rx coil, and also receives data transmitted by the electromagnetic induction pen. Patent Document 1 discloses an example of the EMR sensor.

PRIOR ART DOCUMENT

Patent Document

Patent Document 1: Japanese Patent No. 6698386

SUMMARY OF INVENTION

Technical Problem

Incidentally, the signal-noise (S/N) ratio of the pen signal received in the sensor controller is preferably as large as possible. There are several methods to improve the S/N ratio, and one of them is a method to configure an electromagnetic induction pen so that a transmission period of the pen signal becomes long. This is because, when a detection period of the pen signal in the sensor controller becomes N times, the level of the received pen signal becomes N times, while the level of received noise remains $N^{1/2}$ times. On the other hand, if the transmission period of the pen signal is increased, another problem, a decrease in the frequency of position detection, occurs. For this problem, if the sensor controller receives the pen signal in parallel by a plurality of Rx coils, it is possible to lengthen the transmission period of the pen signal without decreasing the frequency of position detection, but then, reception circuits the number of which corresponds to the parallel receptions are needed, and the circuit scale of the sensor controller increases.

Therefore, one of objects of the present invention is to provide a method executed by a sensor controller of the electromagnetic resonance system, a sensor controller, and a position detection device that can improve the S/N ratio of a pen signal received in the sensor controller, without decreasing the frequency of position detection and without increasing the circuit scale of the sensor controller.

Technical Solution

A method according to the present invention is a method of pen signal retrieval executed by a sensor controller of an electromagnetic resonance system, in which, in each of a plurality of pen signal detection periods, a plurality of coils are connected in connection modes, wherein the connection modes have different connection polarities for each pen signal detection period, and a result value indicating a level of a pen signal is detected via the plurality of coils, and the level of the pen signal corresponding to each of the plurality of coils is separately acquired by performance of a restoration operation by the sensor controller according to the connection polarities on a plurality of the result values detected in the respective pen signal detection periods.

A sensor controller according to the present invention is a sensor controller connected to a sensor including a plurality of coils, in which, in each of a plurality of pen signal detection periods, the plurality of coils are connected in connection modes having different connection polarities for each pen signal detection period, and a result value indicating a level of a pen signal is detected via the plurality of coils, and the level of the pen signal corresponding to each of the plurality of coils is separately acquired by performing a restoration operation according to the connection polarities on a plurality of the result values detected in the respective pen signal detection periods.

A position detection device according to the present invention is a position detection device including a sensor that includes a plurality of coils, and a sensor controller that connects, in each of a plurality of pen signal detection periods, the plurality of coils in connection modes having different connection polarities for each pen signal detection period, that detects a result value indicating a level of a pen signal via the plurality of coils, and that separately acquires the level of the pen signal corresponding to each of the plurality of coils by performing a restoration operation according to the connection polarities on a plurality of the result values detected in the respective pen signal detection periods.

Advantageous Effect

According to the present invention, since the pen signals received by the plurality of coils can be simultaneously received by one reception circuit in each of the plurality of pen signal detection periods and the received signal (superimposed signal of the pen signals received by the plurality of coils) can be separated for each coil, the S/N ratio of the pen signal received in the sensor controller can be improved without decreasing the frequency of position detection and without increasing the circuit scale of the sensor controller.

DETAILED DESCRIPTION

Hereinafter, embodiments of the present invention will be described in detail with reference to the accompanying drawings.

Figure 1:
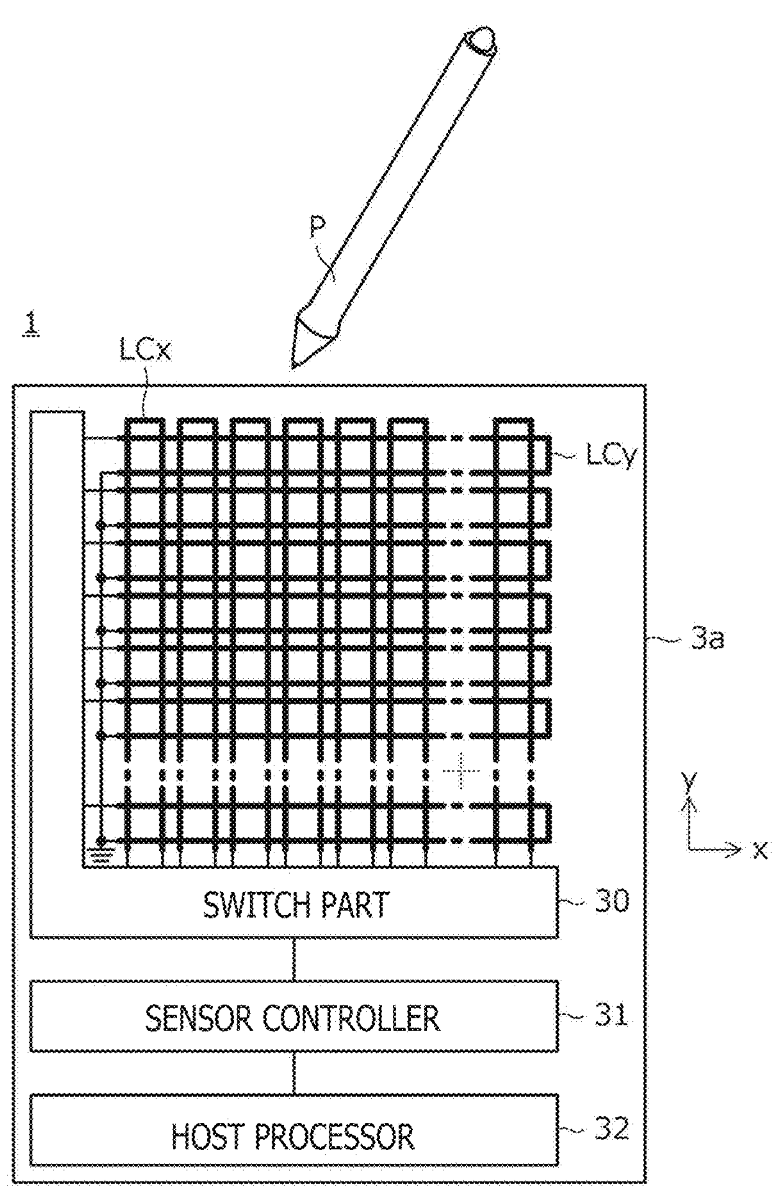
FIG. 1 is a diagram depicting a configuration of a position detection system 1 according to a first embodiment of the present invention.

FIG. 1 is a diagram depicting a configuration of a position detection system 1 according to a first embodiment of the present invention. As depicted in the drawing, the position detection system 1 has an electromagnetic induction pen P and a position detection device 3. Among them, the electromagnetic induction pen P is a pen supporting position detection by the EMR system and has therein a resonance circuit including a coil and a capacitor.

The position detection device 3 is a device supporting position detection of the electromagnetic induction pen P by the EMR system and includes a plurality of loop coils LCx, a plurality of loop coils LCy, a switch part 30, a sensor controller 31, and a host processor 32. Although the position detection device 3 according to a typical example is a tablet terminal or a notebook personal computer whose display surface also serves as a touch surface, the position detection device 3 may be configured with a digitizer or the like having no display surface.

Illustrated x and y directions are both directions in the touch surface and are orthogonal to each other. The plurality of loop coils LCx are each formed to extend in the y direction (first direction) and are arranged side by side in the x direction (second direction). Both ends of each loop coil LCx are connected to the switch part 30. Meanwhile, the plurality of loop coils LCy are each formed to extend in the x direction and are arranged side by side in the y direction. One end of each loop coil LCy is connected to the switch part 30, and the other end thereof is grounded.

The switch part 30 is an aggregate of switches configured with a plurality of switches for switching mutual connection between the plurality of loop coils LCx and for switching connection between the plurality of loop coils LCx and the plurality of loop coils LCy on one hand and the sensor controller 31 on the other hand. The switch part 30 may be provided in a dedicated circuit substrate or integrated circuit or may be provided in the same integrated circuit as the sensor controller 31. The switching state of the switch part 30 is controlled by the sensor controller 31.

Figure 2:
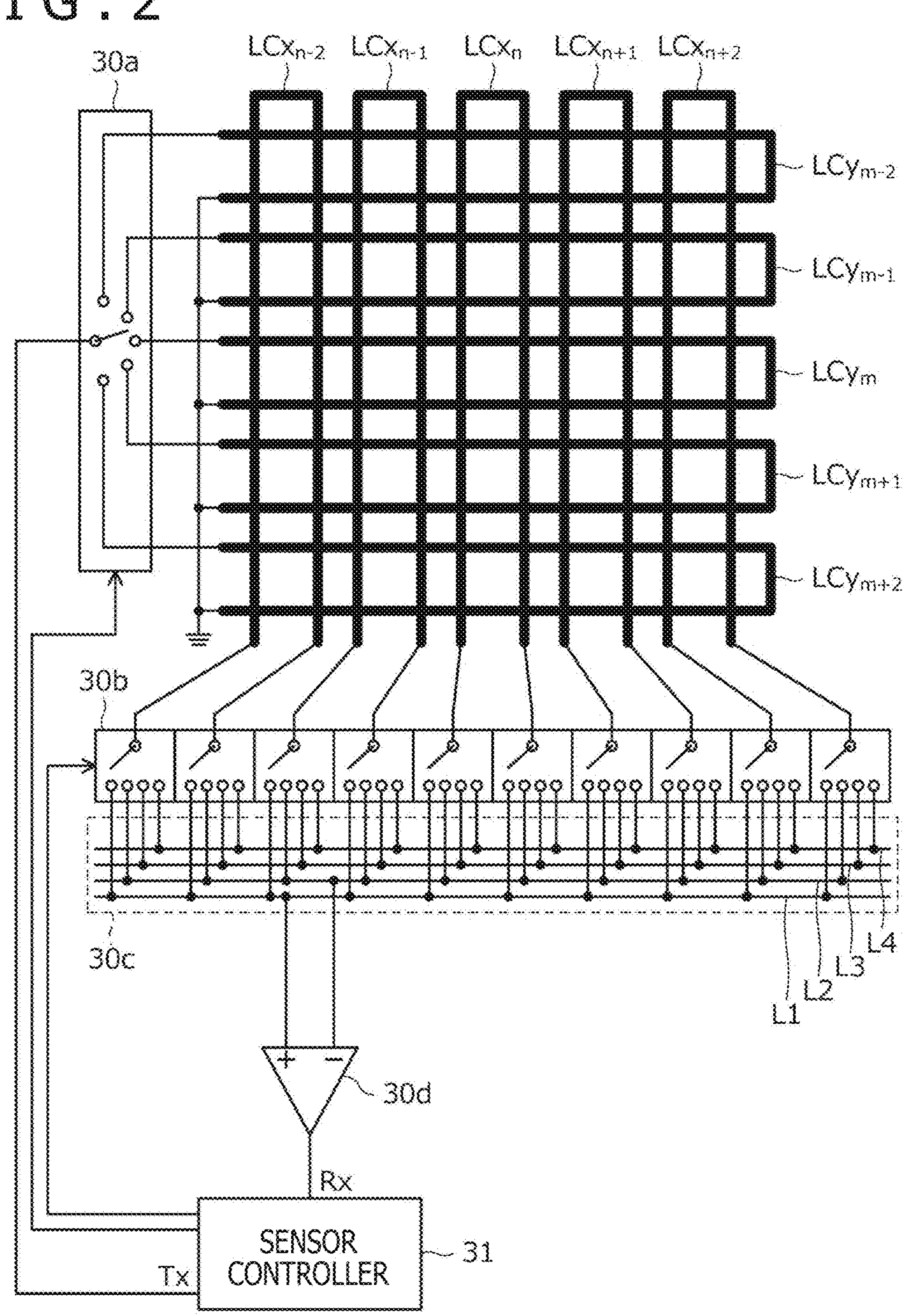
FIG. 2 is a diagram depicting an internal configuration of a switch part 30 depicted in FIG. 1.

FIG. 2 is a diagram depicting an internal configuration of the switch part 30. For simplicity, only five loop coils LCx and five loop coils LCy (loop coils $LCx_{n-2}$ to $LCx_{n+2}$ and loop coils $LCy_{m-2}$ to $LCy_{m+2}$) are illustrated in the drawing. As depicted in the drawing, the switch part 30 includes two kinds of switches 30*a* and 30*b*, a wiring part 30*c*, and a differential amplifier 30*d*.

The switch 30*a* is configured to supply an alternating current Tx for generating an alternating magnetic field on the touch surface to the loop coils LCy and has an input pin to which the alternating current Tx is supplied from the sensor controller 31 and an output pin provided for each loop coil LCy. The switch 30*a* serves to connect the input pin to any of the output pins according to the control of the sensor controller 31.

The switch 30*b* and the wiring part 30*c* are configured to supply a pen signal (transmitted by the electromagnetic induction pen P according to the alternating magnetic field) received by each loop coil LCx to a differential amplifier 30*h*. The switch 30*b* has an input pin provided for each end of the loop coils LCx and four output pins provided for each input pin. The switch 30*b* serves to connect each input pin to any of the corresponding four output pins according to the control of the sensor controller 31.

The wiring part 30*c* has four wirings L1 to L4. The four output pins provided for each input pin of the switch 30*b* are provided in association with the four wirings L1 to L4 and are connected to the corresponding wirings.

The differential amplifier 30*d* is a circuit that generates a received signal Rx by amplifying a voltage difference between a non-inverting input terminal connected to the wiring L1 and an inverting input terminal connected to the wiring L2, and configures a reception circuit of the pen signal together with the sensor controller 31. The received signal Rx generated by the differential amplifier 30*h* is supplied to the sensor controller 31.

With reference back to FIG. 1, the sensor controller 31 is an integrated circuit having a function of detecting the position of the electromagnetic induction pen P in the touch surface by the EMR system. The sensor controller 31 also has a function of acquiring data transmitted by the electromagnetic induction pen P, by demodulating the pen signal transmitted by the electromagnetic induction pen P. The sensor controller 31 is configured to sequentially provide the detected position and the acquired data to the host processor 32.

By using the position and data supplied from the sensor controller 31, the host processor 32 performs processes such as movement of a cursor displayed on the display surface and generation of stroke data indicating a locus of the electromagnetic induction pen P in the touch surface. Regarding the stroke data among them, the host processor 32 also performs a process of rendering and displaying the generated stroke data, a process of generating and recording a digital ink including the generated stroke data, and a process of transmitting the generated digital ink to an external device according to an instruction made by the user, for example.

Hereinafter, a position detection process of the electromagnetic induction pen P performed by the sensor controller 31 will specifically be described with reference to FIG. 3 to FIG. 5.

Figure 3:
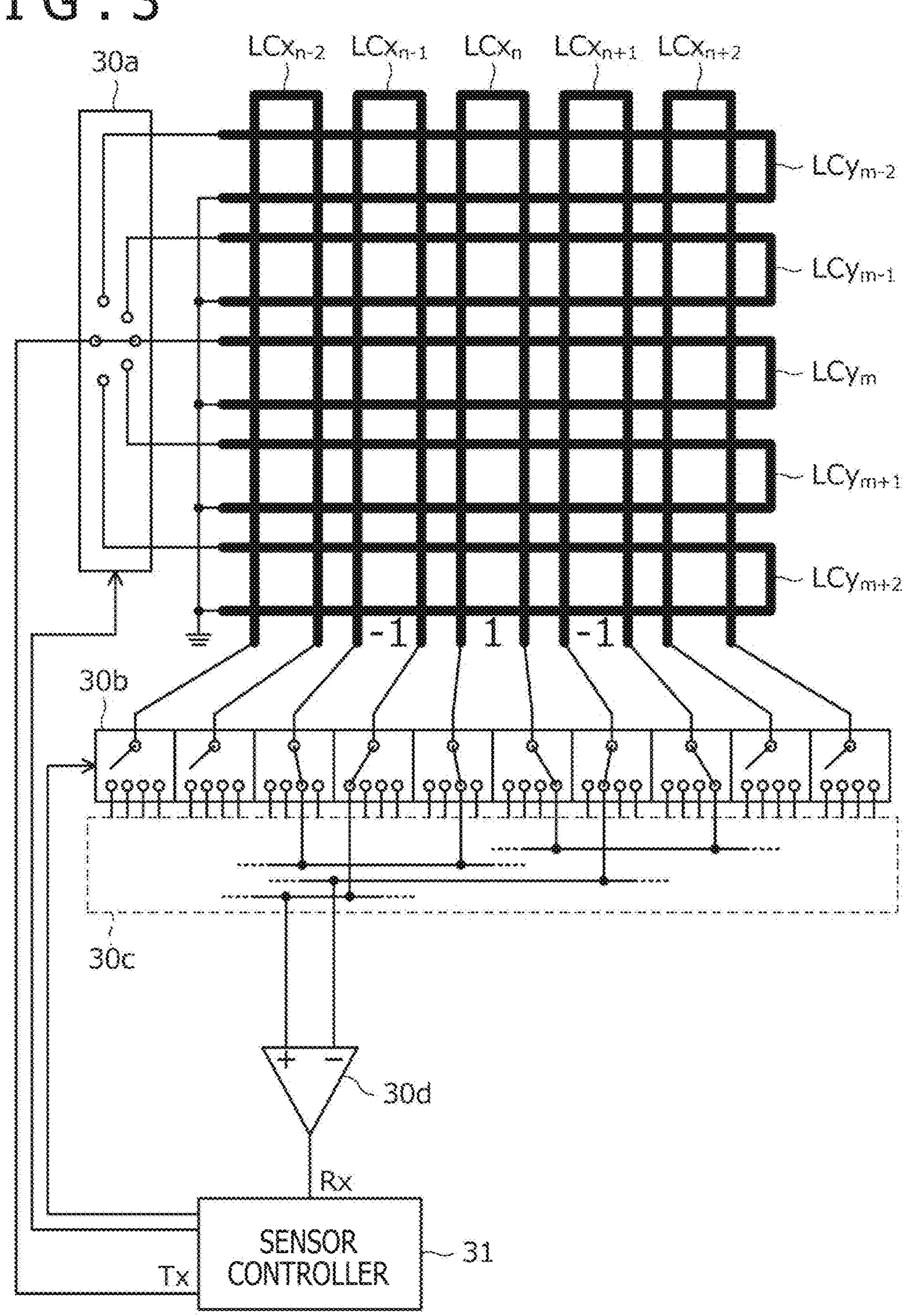
FIG. 3 is a diagram depicting a state of the switch part 30 in a case where a sensor controller 31 detects the position of an electromagnetic induction pen P.
Figure 4:
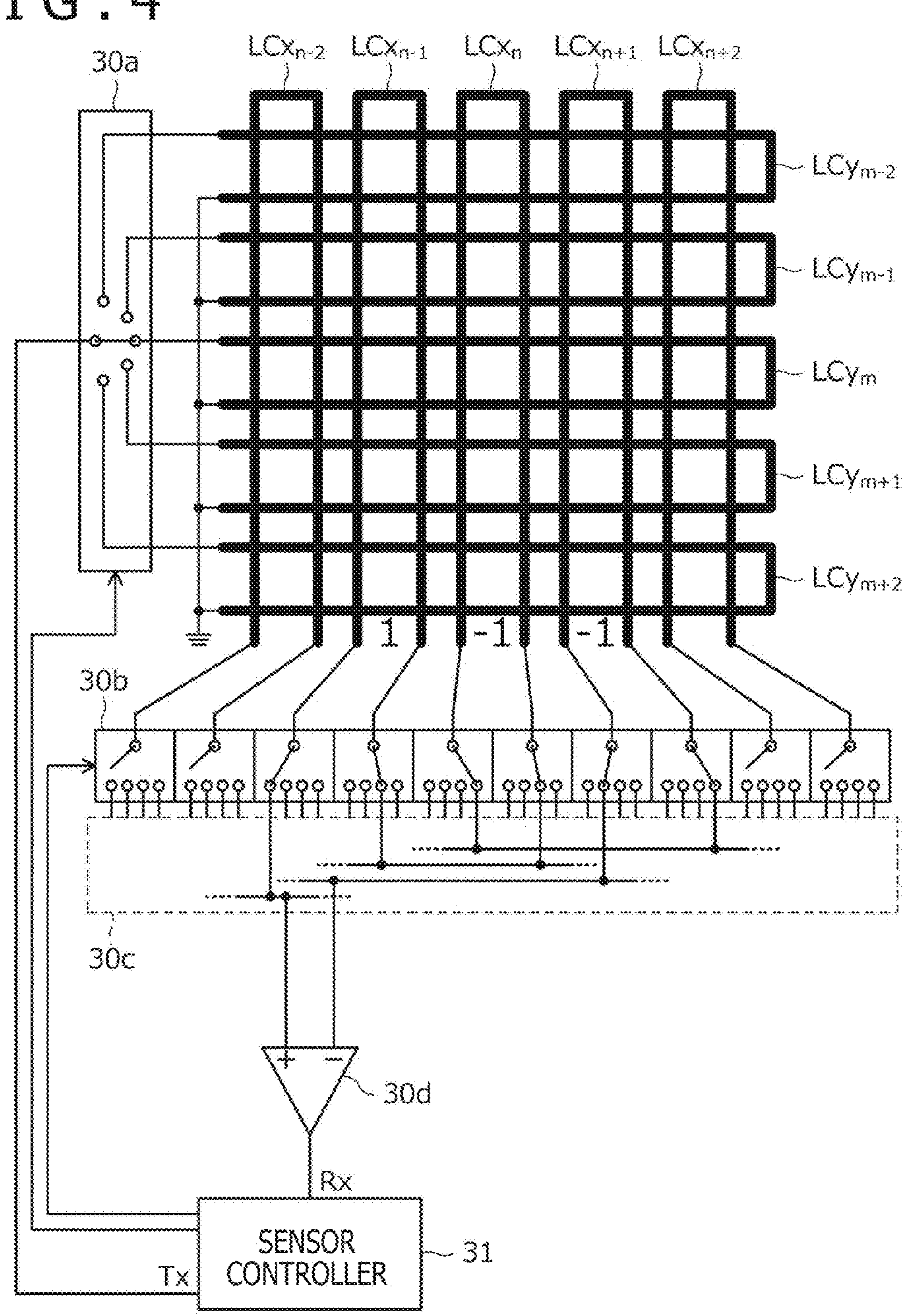
FIG. 4 is a diagram depicting a state of the switch part 30 in the case where the sensor controller 31 detects the position of the electromagnetic induction pen P.
Figure 5:
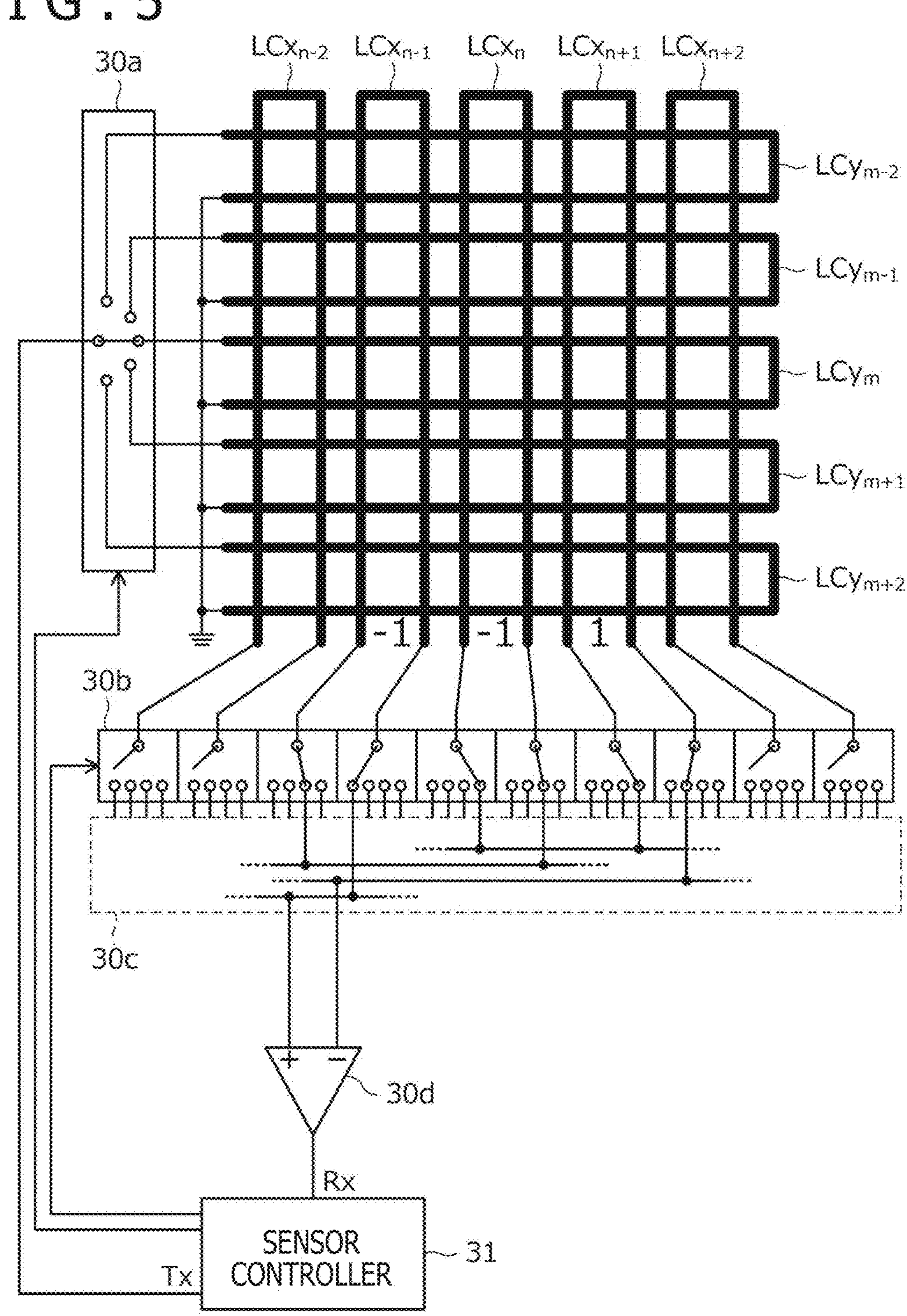
FIG. 5 is a diagram depicting a state of the switch part 30 in the case where the sensor controller 31 detects the position of the electromagnetic induction pen P.

FIG. 3 to FIG. 5 are diagrams each depicting a state of the switch part 30 in the case where the sensor controller 31 detects the position of the electromagnetic induction pen P. The sensor controller 31 is configured to sequentially send an alternating magnetic field from each of the plurality of loop coils LCy by supplying the alternating current Tx while switching the switch 30*a.*

While the alternating magnetic field is sent from one loop coil $LCy_m$, the sensor controller 31 selects a set of three adjacent loop coils LCx as one set in order, and each time, performs a process of controlling the switch 30*b* such that the three loop coils LCx configuring the selected set are connected in series to the differential amplifier 30*d* in three connection modes having different connection polarities. With this process, the differential amplifier 30*d* detects a result value indicating the level of the pen signal on the basis of the potential between both ends of a composite coil including the three loop coils LCx connected in series, and outputs the result value to the sensor controller 31 as the received signal Rx.

FIG. 3 to FIG. 5 depict connections in the three connection modes described above. Specifically, in the example of FIG. 3, when viewed from the non-inverting input terminal of the differential amplifier 30*d*, the loop coil $LCX_{n-1}$ is connected counterclockwise (denoted as "−1" in the drawing), then the loop coil $LCx_n$ is connected clockwise (denoted as "1" in the drawing), and finally the loop coil $LCx_{n+1}$ is connected counterclockwise. In addition, in the example of FIG. 4, when viewed from the non-inverting input terminal of the differential amplifier 30*d*, the loop coil $LCX_{n-1}$ is connected clockwise, then the loop coil $LCx_n$ is connected counterclockwise, and finally the loop coil $LCx_{n+1}$ is connected counterclockwise. In the example of FIG. 5, when viewed from the non-inverting input terminal of the differential amplifier 30*d*, the loop coil $LCX_{n-1}$ is connected counterclockwise, then the loop coil $LCx_n$ is connected counterclockwise, and finally the loop coil $LCx_{n+1}$ is connected clockwise.

Figure 6:
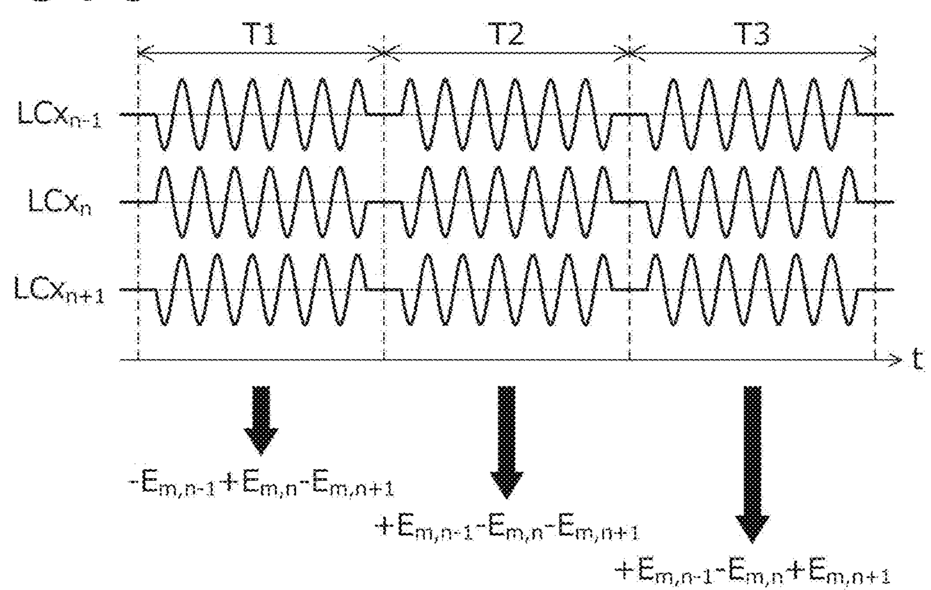
FIG. 6 is a diagram describing a received signal Rx supplied from a differential amplifier 30*h* to the sensor controller 31.

FIG. 6 is a diagram describing the received signal Rx supplied from the differential amplifier 30*d* to the sensor controller 31, as a result of the above-described connection. Illustrated pen signal detection periods T1 to T3 correspond to the connection states of FIG. 3 to FIG. 5, respectively. It should be noted that a sending time of the alternating magnetic field is actually arranged in the first half of each pen signal detection period, but is omitted in FIG. 6. In addition, although the actual received signal Rx attenuates with time, the attenuation is not depicted in FIG. 6 for ease of understanding. These points are similar in FIG. 7 and FIG. 8 described later.

With reference to FIG. 6, it is understood that the pen signals received in the pen signal detection period T1 have opposite phases between the loop coil $LCx_n$ on one hand and the loop coils $LCX_{n-1}$ and $LCx_{n+1}$ on the other hand. This is because, as described above, the loop coil $LCx_n$ is connected clockwise and the loop coils $LCX_{n-1}$ and $LCx_{n+1}$ are connected counterclockwise. As a result, if it is assumed that the levels of the pen signals received by the loop coils $LCx_{n-1}$ to $LCx_{n+1}$ when the sensor controller 31 generates the alternating magnetic field in the loop coil $LCy_m$ are denoted by levels $E_{m,\ n-1}$ to $E_{m,\ n+1}$, respectively, the received signal Rx (result value) supplied from the differential amplifier 30*d* to the sensor controller 31 in the pen signal detection period T1 is expressed as $-E_{m,\ n-1}+E_{m,\ n}-E_{m,\ n+1}$, as depicted in FIG. 6. This is similar in the pen signal detection periods T2 and T3, and the received signals are expressed as $+E_{m,\ n-1}-E_{m,\ n}-E_{m,\ n+1}$ and $-E_{m,\ n-1}-E_{m,\ n}+E_{m,\ n+1}$, respectively.

With reference back to FIG. 3 to FIG. 5, a vector $d_{series}$ depicted in the following equation (1) describes the received signal Rx received in each of the pen signal detection periods T1 to T3 in a vector form. The vector $d_{series}$ can be transformed into a product of a 3×3 matrix F (first matrix) representing the connection polarities in each pen signal detection period and vectors representing the levels $E_{m,\ n-1}$ to $E_{m,\ n+1}$, as depicted in the last line of the equation (1). It should be noted that the matrix F depicted in the equation (1) uses a 3×3 Walsh code.

Math. 1

$$d_{series} = \begin{pmatrix} -E_{m,n-1} + E_{m,n} - E_{m,n+1} \\ +E_{m,n-1} - E_{m,n} - E_{m,n+1} \\ -E_{m,n-1} - E_{m,n} + E_{m,n+1} \end{pmatrix} = \begin{pmatrix} -1 & 1 & -1 \\ 1 & -1 & -1 \\ -1 & -1 & 1 \end{pmatrix} \begin{pmatrix} E_{m,n-1} \\ E_{m,n} \\ E_{m,n+1} \end{pmatrix} = F \begin{pmatrix} E_{m,n-1} \\ E_{m,n} \\ E_{m,n+1} \end{pmatrix} \quad (1)$$

The sensor controller 31 separately acquires the levels $E_{m,\ n-1}$ to $E_{m,\ n+1}$ by performing the operation depicted in the left side of the following equation (2) on the vector $d_{series}$. However, a matrix $F^{-1}$ depicted in the equation (2) is an inverse matrix of the matrix F, and therefore, the operation depicted in the left side of the equation (2) is a restoration operation according to the connection polarities of the loop coils LCx in each connection mode described above. Since a unit matrix I is obtained by multiplying the matrix F by the matrix $F^{-1}$ as depicted in the equation (2), the sensor controller 31 performs the restoration operation and can separately acquire the levels $E_{m,\ n-1}$ to $E_{m,\ n+1}$ of the pen signals received by the respective loop coils $LCx_{n-1}$ to $LCx_{n+1}$ in a case where the alternating magnetic field is sent from the m-th loop coil $LCy_m$ as depicted in the right side of the equation (2).

Math. 2

$$F^{-1} d_{series} = F^{-1} F \begin{pmatrix} E_{m,n-1} \\ E_{m,n} \\ E_{m,n+1} \end{pmatrix} = I \begin{pmatrix} E_{m,n-1} \\ E_{m,n} \\ E_{m,n+1} \end{pmatrix} = \begin{pmatrix} E_{m,n-1} \\ E_{m,n} \\ E_{m,n+1} \end{pmatrix} \quad (2)$$

The sensor controller 31 separately acquires the levels of the pen signals received by the respective loop coils LCx in the case where the alternating magnetic field is sent from the m-th loop coil $LCy_m$ by executing the operation similar to the equation (2) for each set of loop coils LCx. The sensor controller 31 also performs the similar process while changing the loop coils $LCy_m$ from which the alternating magnetic field is sent, so that the levels of the pen signals received by the respective loop coils LCx in the case where the alternating magnetic field is sent from each of the plurality of loop coils $LCy_m$ are acquired. Then, the sensor controller 31 derives the position of the electromagnetic induction pen P on the basis of a distribution of the levels of the pen signals thus acquired in the touch surface. Specifically, the position corresponding to an apex of the distribution may be derived as the position of the electromagnetic induction pen P.

Here, a comparative example in which the pen signals are received by a method different from that of the present embodiment will be taken up to describe one of the effects obtained by using the present embodiment.

Figure 7:
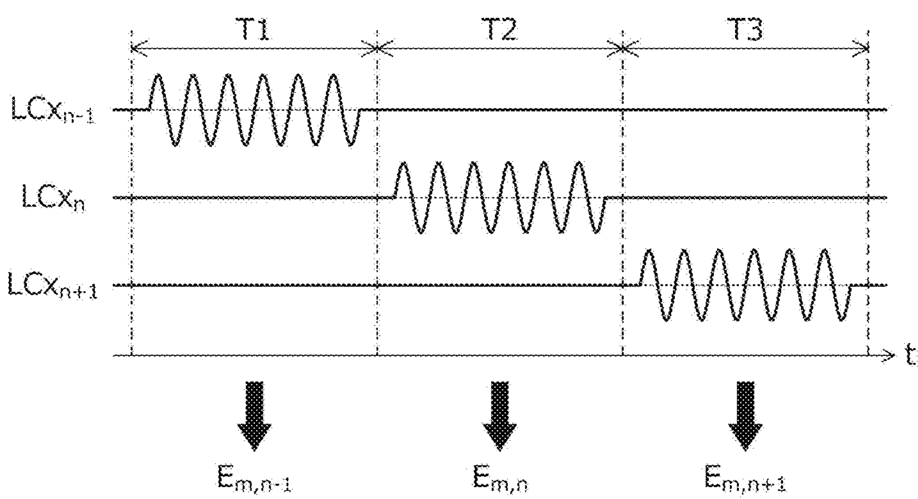
FIG. 7 is a diagram describing a received signal Rx according to a first comparative example.

FIG. 7 is a diagram describing a received signal Rx according to a first comparative example. The sensor controller 31 of the present comparative example connects one loop coil LCx to the differential amplifier 30*d* in each pen signal detection period. In this case, since the level of the pen signal received by one loop coil LCx is obtained in each pen signal detection period, the sensor controller 31 can acquire the level of the pen signal received by each loop coil LCx, without performing the above-described operation.

Figure 8:
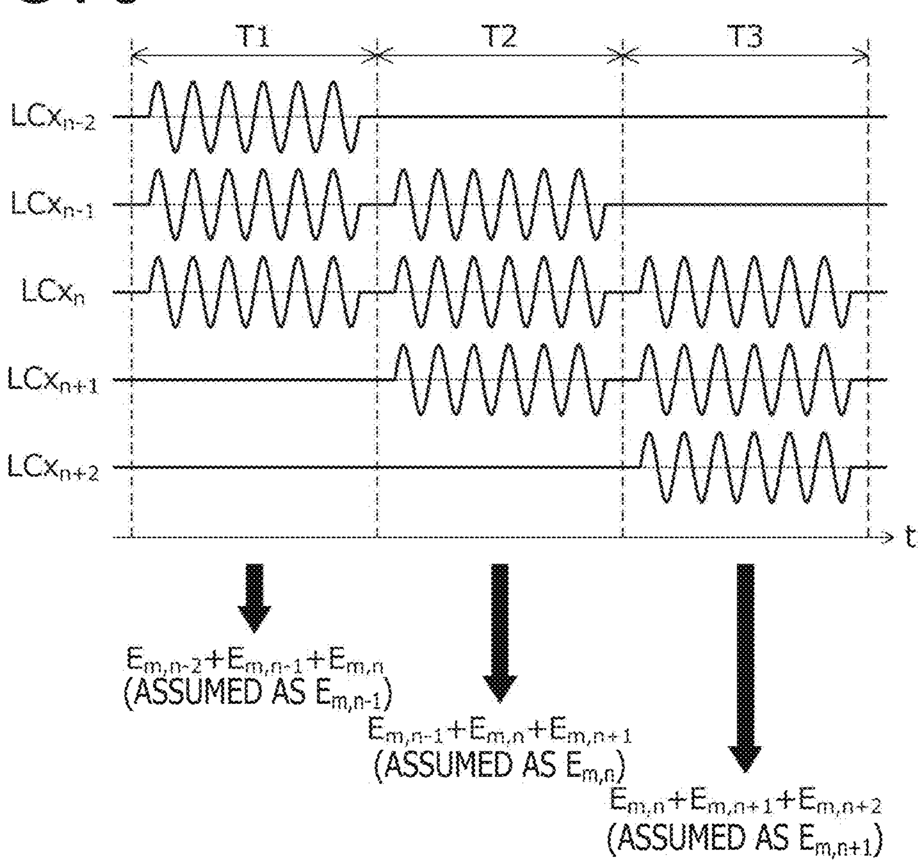
FIG. 8 is a diagram describing a received signal Rx according to a second comparative example.

FIG. 8 is a diagram describing a received signal Rx according to a second comparative example. The sensor controller 31 according to the present comparative example connects three adjacent loop coils LCx to the differential amplifier 30*d* in series in each pen signal detection period, as in the present embodiment. However, the sensor controller 31 according to the present comparative example connects all the loop coils LCx in the same direction (clockwise or counterclockwise). In this case, although the levels of the pen signals received by the respective loop coils LCx cannot be separated by the above-described operation, the sensor controller 31 can derive the position of the electromagnetic induction pen P by assuming that the received signals Rx obtained through the three loop coils LCx are obtained by the loop coil LCx positioned at the center of the three loop coils LCx.

Figure 9:
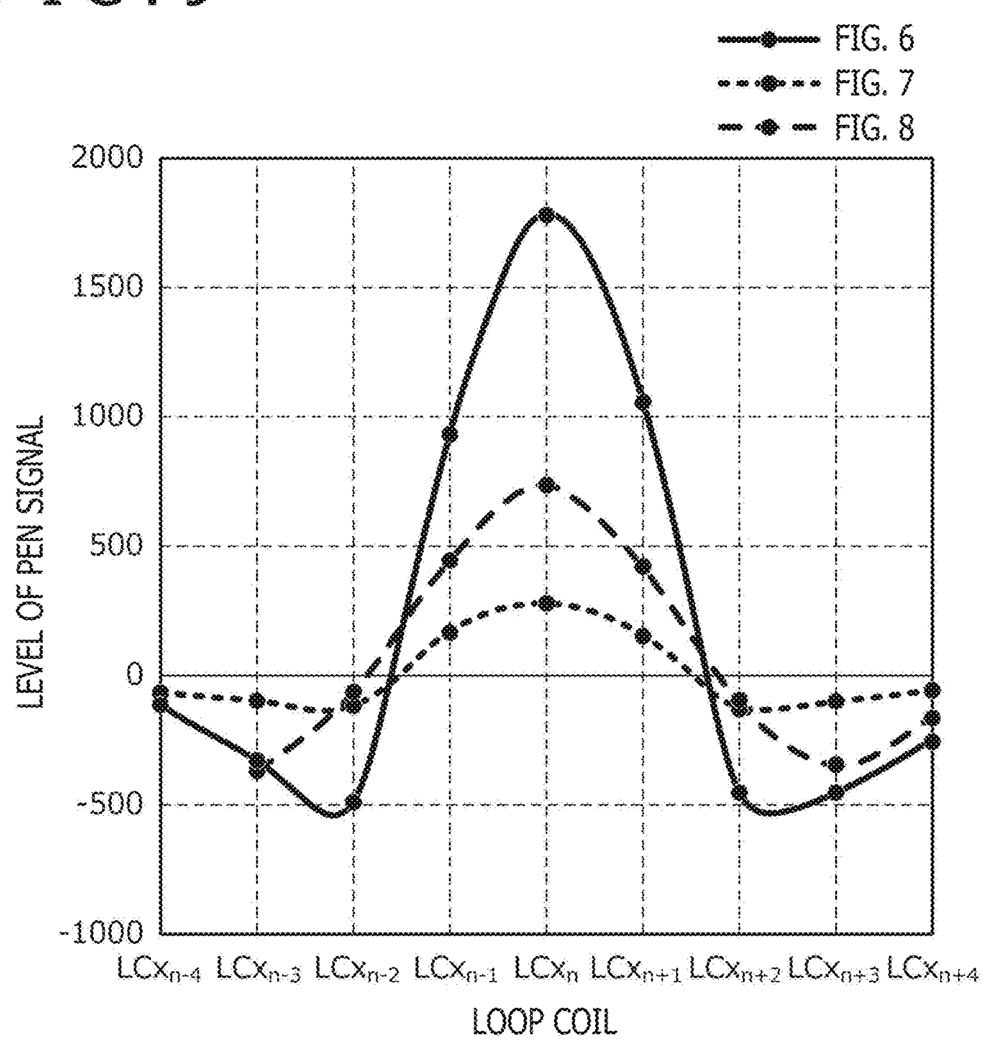
FIG. 9 is a diagram depicting a simulation result of levels of pen signals received by respective loop coils LCx in the vicinity of a loop coil $LCx_n$ in a case where the electromagnetic induction pen P is positioned on the loop coil $LCx_n$.

FIG. 9 is a diagram depicting a simulation result of the levels of the pen signals (the levels after the separation in the case of the separation acquisition) received by the respective loop coils LCx in the vicinity of the loop coil $LCx_n$ in a case where the electromagnetic induction pen P is positioned on the loop coil $LCx_n$. FIG. 9 depicts results of the present embodiment (FIG. 6), the first comparative example (FIG. 7), and the second comparative example (FIG. 8). As depicted in the drawing, according to the reception method of the pen signal according to the present embodiment, it is possible to obtain an effect that the reception level of the pen signal significantly becomes high as compared with the first and second comparative examples. This is because, according to the reception method of the pen signal according to the present embodiment, the pen signal detection period that can be used to obtain the pen signal received by each loop coil LCx is three times as long as that of the first and second comparative examples. Here, as described above, when the pen signal detection period of the pen signal in the sensor controller 31 becomes N times, the level of the received pen signal becomes N times, while the level of received noise remains at $N^{1/2}$ times. Therefore, according to the reception method of the pen signal according to the present embodiment, it can be said that the S/N ratio of the pen signal received in the sensor controller 31 can be improved.

In addition, according to the reception method of the pen signal according to the present embodiment, since the pen signals received by the plurality of loop coils LCx can be simultaneously received by one reception circuit in each of the plurality of pen signal detection periods and the received signals Rx can be separated into components for each loop coil LCx, it is not necessary to lengthen a transmission period of the pen signal in order to improve the S/N ratio, and it is not necessary to add a reception circuit in order to receive the pen signals by the plurality of loop coils LCx in parallel. Therefore, according to the reception method of the pen signal according to the present embodiment, it can be said that the S/N ratio of the pen signal received in the sensor controller 31 can be improved without decreasing the frequency of position detection and without increasing the circuit scale of the sensor controller 31.

Here, the point that the level of the noise remains at $N^{1/2}$ times when the pen signal detection period of the pen signal in the sensor controller 31 becomes N times will be described in detail.

If it is assumed that a received signal Rx acquired in a k-th pen signal detection period is $X_k$ and a variance thereof is expressed as $V(X_k)$, a variance $V_{TOTAL}$ of a signal (hereinafter, simply referred to as an "addition signal") obtained by adding up the received signals $X_1$ to $X_N$ for N times acquired in the first to N-th pen signal detection periods is expressed by the sum of variances of the received signals Rx in each pen signal detection period, by the additivity of variances, as depicted in the following equation (3).

Math. 3

$$V_{TOTAL} = V(X_1) + V(X_2) + V(X_3) + \cdots + V(X_N) \tag{3}$$

When focusing only on the noise component included in the received signal Rx, it is considered that the noise has the same value in all the pen signal detection periods, and thus, the variance $V_{TOTAL}$ of the addition signal is further expressed by the following equation (4). It should be noted that V and $\sigma$ are a variance and a standard deviation in each pen signal detection period, respectively.

Math. 4

$$V_{TOTAL} = V + V + V + \cdots + V = N \cdot V = N \cdot \sigma^2 \tag{4}$$

The amount of noise appearing in the addition signal is expressed by a standard deviation $\sigma_{TOTAL}$ of the addition signal. From the equation (4), the standard deviation $\sigma_{TOTAL}$ is expressed as the following equation (5), and thus, it is understood that the level of the noise remains at $N^{1/2}$ times when the pen signal detection period of the pen signal in the sensor controller 31 becomes N times.

Math. 5

$$\sigma_{TOTAL} = \sqrt{V_{TOTAL}} = \sqrt{N}\sigma \tag{5}$$

As described above, according to the position detection system 1 according to the present embodiment, the S/N ratio of the pen signal received in the sensor controller 31 can be improved without decreasing the frequency of position detection and without increasing the circuit scale of the sensor controller 31.

In addition, according to the position detection system 1 according to the present embodiment, since the differential amplifier 30*d* is used to receive the received signal Rx, even if resistance values vary among the loop coils LCx, variations in the level of the pen signal can be suppressed. This is particularly effective in a case where the loop coils LCx are configured using, for example, a high impedance material such as metal mesh.

It should be noted that an example in which the matrix F depicted in the equation (1) is a matrix represented by a 3×3 Walsh code has been described in the present embodiment, but a matrix represented by a code other than the Walsh code, such as an orthogonal variable spreading factor (OVSF) code, an M-sequence code, or a Baker code, can suitably be used as the matrix F (that is, the connection modes of the loop coils LCx in each pen signal detection period can be set such that the matrix F has these codes).

In addition, an example of performing the restoration operation using the inverse matrix $F^{-1}$ of the matrix F has been described in the present embodiment, but it is also possible to perform the restoration operation using a matrix that is not the inverse matrix. Hereinafter, an example of the restoration operation using the matrix F itself as a matrix that is not the inverse matrix of the matrix F will be described by taking as an example a case where the vector $d_{series}$ depicted in the equation (1) has been obtained.

In this example, first, by using the matrix F for restoration and the levels $-E_{m,n-1}+E_{m,n}-E_{m,n+1}$, $+E_{m,n-1}-E_{m,n}-E_{m,n+1}$, and $-E_{m,n-1}-E_{m,n}+E_{m,n+1}$ of the received signals Rx in the pen signal detection periods T1 to T3, the level of the received signal Rx corresponding to a case where all the columns of the matrix F are 1 is derived. Specifically, the level of the received signal Rx corresponding to the case where all the columns of the matrix F are 1 may be derived by solving the simultaneous equation depicted in the following equation (6) to obtain a, b, and c and deriving a+b+c. The level thus derived is $+E_{m,n-1}+E_{m,n}+E_{m,n-2}$.

Math. 6

$$\begin{pmatrix} -1 & 1 & -1 \\ 1 & -1 & -1 \\ -1 & -1 & 1 \end{pmatrix} \begin{pmatrix} a \\ b \\ c \end{pmatrix} = \begin{pmatrix} -E_{m,n-1} + E_{m,n} - E_{m,n+1} \\ +E_{m,n-1} - E_{m,n} - E_{m,n+1} \\ -E_{m,n-1} - E_{m,n} + E_{m,n+1} \end{pmatrix} \tag{6}$$

Next, as depicted in the following equation (7), a column in which the values of all the elements are 1 is added to the head of the matrix F, a row in which the value is $+E_{m,n-1}+E_{m,n}+E_{m,n-2}$ is added to the head of the vector $d_{series}$, and then the matrix F is multiplied by the vector $d_{series}$. Consequently, a result obtained by linearly amplifying (specifically, four times) the operation result of the equation (6) can be obtained.

Math. 7

$$\begin{pmatrix} 1 & -1 & 1 & -1 \\ 1 & 1 & -1 & -1 \\ 1 & -1 & -1 & 1 \end{pmatrix} \begin{pmatrix} +E_{m,n-1} + E_{m,n} + E_{m,n+1} \\ -E_{m,n-1} + E_{m,n} - E_{m,n+1} \\ +E_{m,n-1} - E_{m,n} - E_{m,n+1} \\ -E_{m,n-1} - E_{m,n} + E_{m,n+1} \end{pmatrix} = 4 \begin{pmatrix} E_{m,n-1} \\ E_{m,n} \\ E_{m,n+1} \end{pmatrix} \tag{7}$$

Thus, in the case where the restoration operation is performed using a matrix that is not the inverse matrix $F^{-1}$ of the matrix F, the level of the received signal Rx corresponding to the case where all the columns of the matrix F are 1 needs to be derived, but the levels $E_{m,n-1}$ to $E_{m,n+1}$ can be separately acquired as in the case where the restoration operation is performed using the inverse matrix $F^{-1}$ of the matrix F.

It should be noted that the result obtained by amplifying the operation result of the equation (2) four times is obtained in the equation (7), but such an increase in the operation result is preferable because it leads to an improvement in the accuracy of an operation in a subsequent stage. The same can be said for the case where the restoration operation is performed using the inverse matrix $F^{-1}$ of the matrix F. Hereinafter, a specific example will be described.

In the case where the matrix F uses a 4×4 Walsh code, the vector $d_{series}$ is expressed as the following equation (8). It should be noted that a vector e is a vector indicating the level of the pen signal received by each of the four loop coils LCx.

Math. 8

$$d_{series} = Fe = \begin{pmatrix} 1 & 1 & 1 & 1 \\ 1 & -1 & 1 & -1 \\ 1 & 1 & -1 & -1 \\ 1 & -1 & -1 & 1 \end{pmatrix} e \tag{8}$$

The inverse matrix $F^{-1}$ of the matrix F depicted in the equation (8) is expressed as the equation (9).

Math. 9

$$F^{-1} = \frac{1}{4} \begin{pmatrix} 1 & 1 & 1 & 1 \\ 1 & -1 & 1 & -1 \\ 1 & 1 & -1 & -1 \\ 1 & -1 & -1 & 1 \end{pmatrix} \tag{9}$$

Therefore, if the inverse matrix $F^{-1}$ is multiplied by 4 as depicted in the following equation (10) when performing the restoration operation of the vector e, a vector having a level four times that of the original vector e can be obtained while performing the restoration operation by the inverse matrix $F^{-1}$.

Math. 10

$$\begin{aligned} 4F^{-1}d_{series} &= \begin{pmatrix} 1 & 1 & 1 & 1 \\ 1 & -1 & 1 & -1 \\ 1 & 1 & -1 & -1 \\ 1 & -1 & -1 & 1 \end{pmatrix} d_{series} \\ &= \begin{pmatrix} 1 & 1 & 1 & 1 \\ 1 & -1 & 1 & -1 \\ 1 & 1 & -1 & -1 \\ 1 & -1 & -1 & 1 \end{pmatrix} \begin{pmatrix} 1 & 1 & 1 & 1 \\ 1 & -1 & 1 & -1 \\ 1 & 1 & -1 & -1 \\ 1 & -1 & -1 & 1 \end{pmatrix} e \\ &= 4e \end{aligned} \tag{10}$$

Next, a position detection system 1 according to a second embodiment of the present invention will be described.

Figure 10:
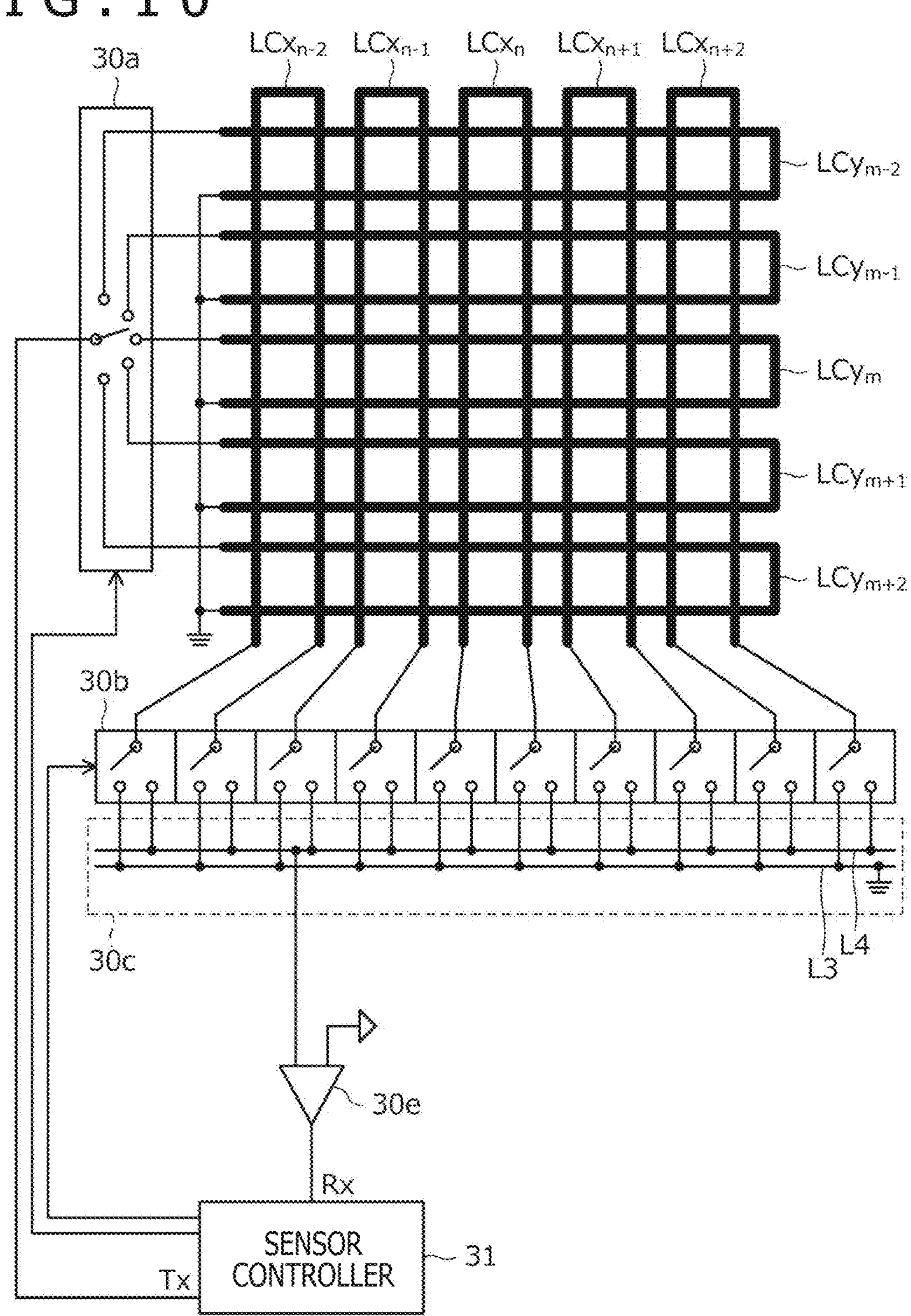
FIG. 10 is a diagram depicting an internal configuration of a switch part 30 arranged in a position detection device 3 configuring a position detection system 1 according to a second embodiment of the present invention.

FIG. 10 is a diagram depicting an internal configuration of a switch part 30 arranged in a position detection device 3 configuring the position detection system 1 according to the second embodiment of the present invention. The switch part 30 according to the present embodiment is different from the switch part 30 according to the first embodiment in that a wiring part 30*c* does not have the wirings L1 and L2, that a switch 30*b* does not have the output pins corresponding to the wirings L1 and L2, that a wiring L3 is grounded, and that an operational amplifier 30*e* having an input terminal connected to a wiring L4 is provided instead of the differential amplifier 30*d*. In addition, a sensor controller 31 according to the present embodiment is different from the sensor controller 31 according to the first embodiment in that three loop coils LCx are connected in parallel, instead of in series, to the operational amplifier 30*e* in order to detect the position of the electromagnetic induction pen P. Since the position detection system 1 according to the present embodiment is similar to the position detection system 1 according to the first embodiment in other points, the description will be continued below by focusing on differences from the position detection system 1 according to the first embodiment.

Figure 11:
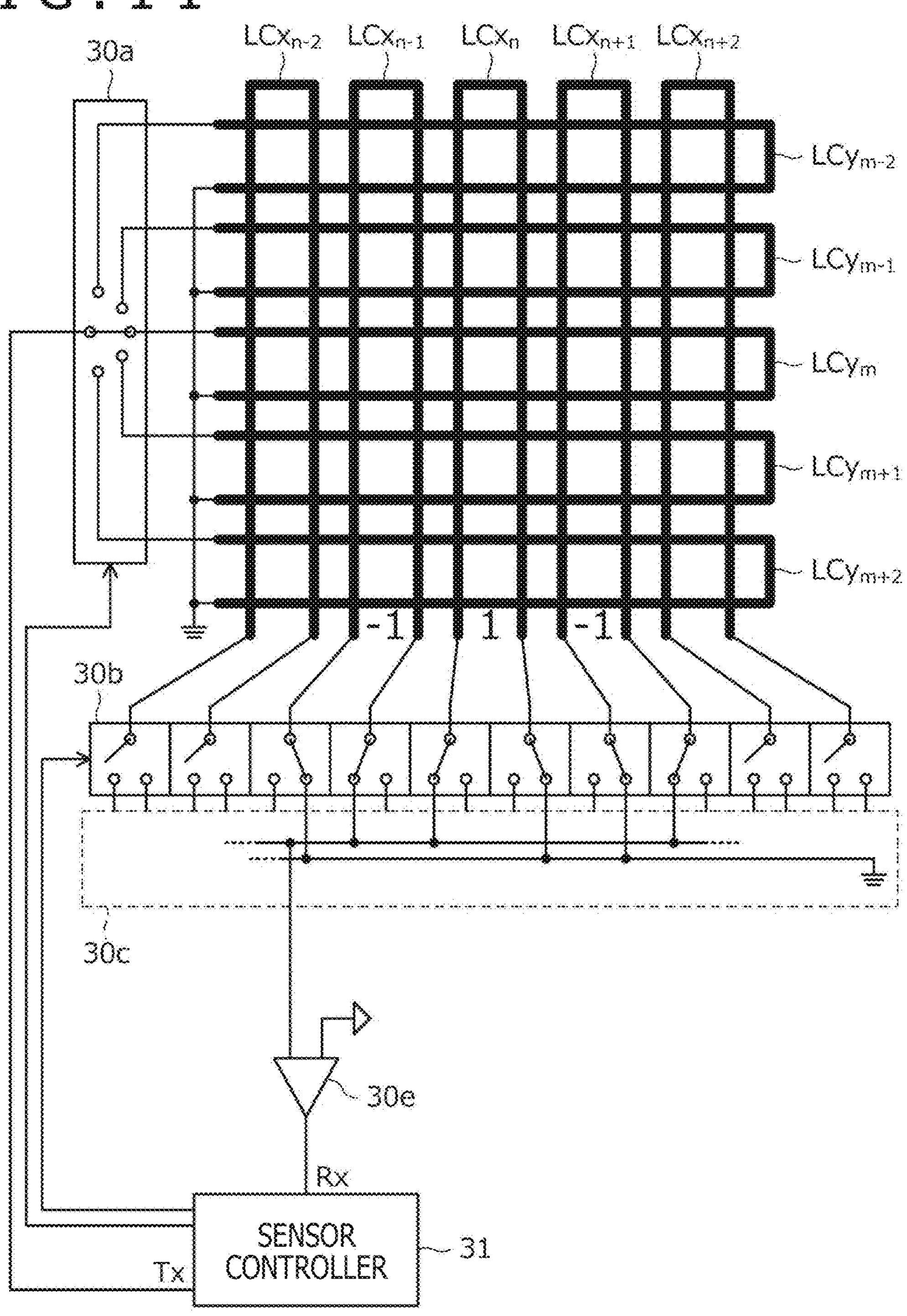
FIG. 11 is a diagram depicting a state of the switch part 30 in a case where a sensor controller 31 detects the position of the electromagnetic induction pen P.
Figure 12:
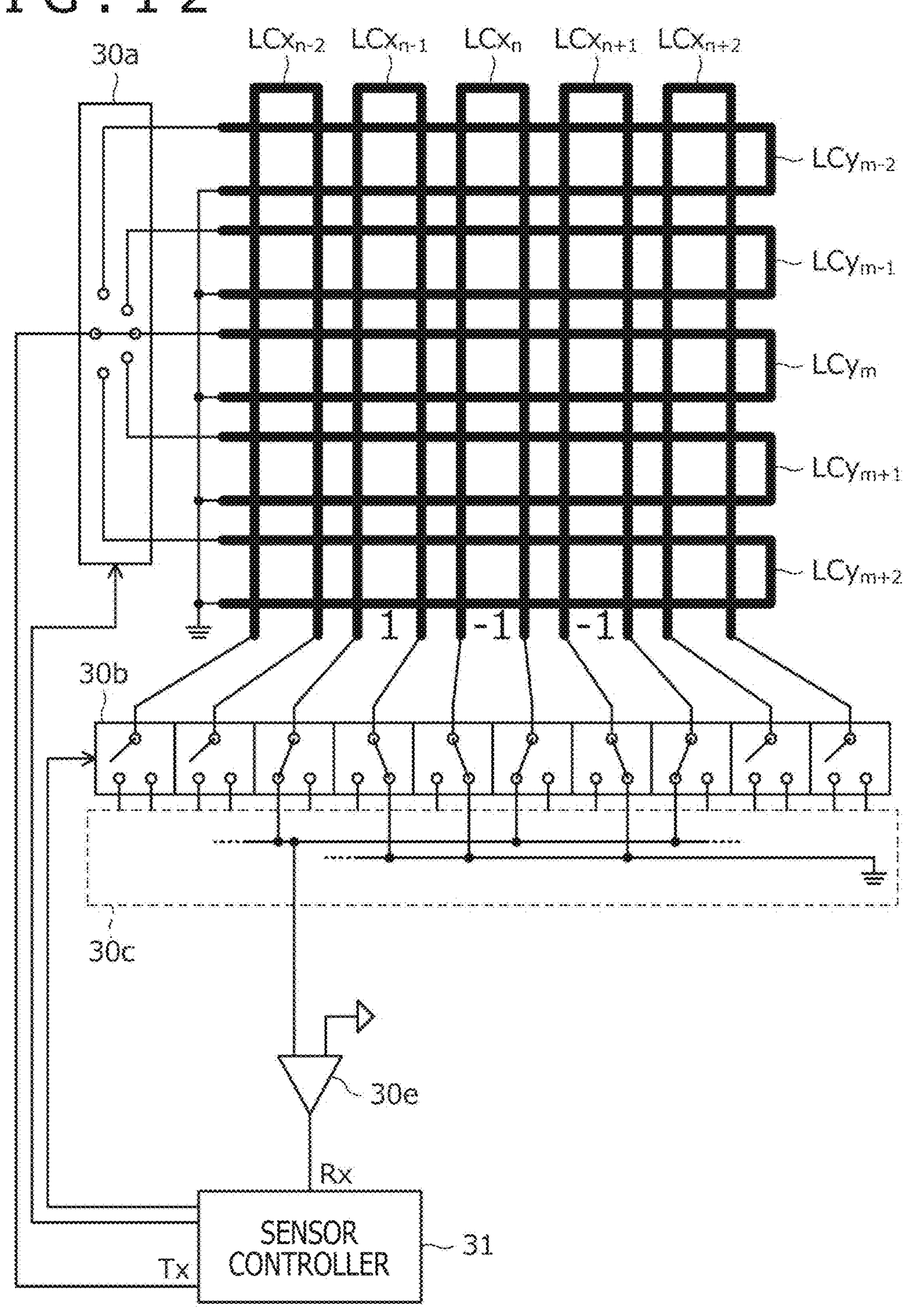
FIG. 12 is a diagram depicting a state of the switch part 30 in the case where the sensor controller 31 detects the position of the electromagnetic induction pen P.
Figure 13:
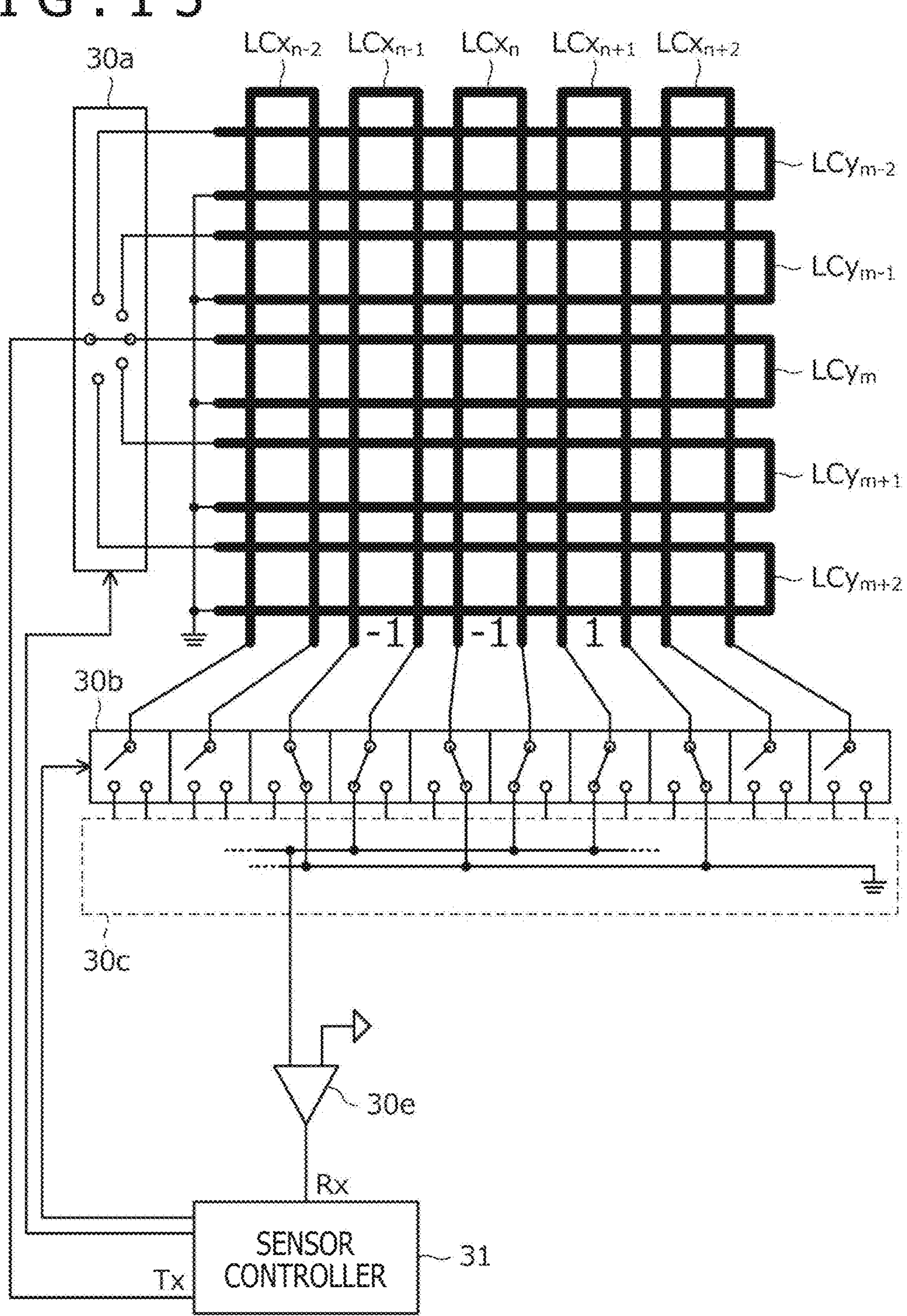
FIG. 13 is a diagram depicting a state of the switch part 30 in the case where the sensor controller 31 detects the position of the electromagnetic induction pen P.

FIG. 11 to FIG. 13 are diagrams each depicting a state of the switch part 30 in a case where the sensor controller 31 according to the present embodiment detects the position of the electromagnetic induction pen P. While an alternating magnetic field is sent from a loop coil $LCy_m$, the sensor controller 31 according to the present embodiment selects a set of three adjacent loop coils LCx as one set in order, and each time, performs a process of controlling the switch 30*b* such that the three loop coils LCx configuring the selected set are connected in parallel to the operational amplifier 30*e* in three connection modes having different connection polarities. With this process, the operational amplifier 30*e* detects a result value indicating the level of the pen signal on the basis of the potential (potential with respect to the ground end) of one end of a composite coil including the three loop coils LCx connected in parallel, and outputs the result value to the sensor controller 31 as a received signal Rx.

FIG. 11 to FIG. 13 depict connections in the three connection modes described above. Specifically, in the example of FIG. 11, when viewed from the input terminal of the operational amplifier 30*e*, the loop coils $LCX_{n-1}$ and $LCx_{n+1}$ are connected counterclockwise (denoted as "−1" in the drawing), and the loop coil $LCx_n$ is connected clockwise (denoted as "1" in the drawing). In addition, in the example of FIG. 12, when viewed from the input terminal of the operational amplifier 30*e*, the loop coil $LCX_{n-1}$ is connected clockwise, and the loop coils $LCx_n$ and $LCx_{n+1}$ are connected counterclockwise. In the example of FIG. 13, when viewed from the input terminal of the operational amplifier 30*e*, the loop coils $LCX_{n-1}$ and $LCx_n$ are connected counterclockwise, and the loop coil $LCx_{n+1}$ is connected clockwise.

As a result of the above-described connection, the received signal Rx supplied from the operational amplifier 30*e* to the sensor controller 31 is expressed by a vector $d_{parallel}$ depicted in the following equation (11). The meanings of the levels $E_{m,\,n-1}$ to $E_{m,\,n+1}$ depicted in the equation (11) are as described in the first embodiment. As depicted in the last line of the equation (11), the vector $d_{parallel}$ can be transformed into a product of a 3×3 matrix F representing the connection polarities in each pen signal detection period and vectors representing the levels $E_{m,\,n-1}$ to $E_{m,\,n+1}$, as with the vector $d_{series}$ described in the first embodiment.

Math. 11

$$d_{parallel} = \begin{pmatrix} -E_{m,n-1} + E_{m,n} - E_{m,n-2} \\ +E_{m,n-1} - E_{m,n} - E_{m,n-2} \\ -E_{m,n-1} - E_{m,n} + E_{m,n-2} \end{pmatrix} = \begin{pmatrix} -1 & 1 & -1 \\ 1 & -1 & -1 \\ -1 & -1 & 1 \end{pmatrix} \begin{pmatrix} E_{m,n-1} \\ E_{m,n} \\ E_{m,n+1} \end{pmatrix} = F \begin{pmatrix} E_{m,n-1} \\ E_{m,n} \\ E_{m,n+1} \end{pmatrix} \quad (11)$$

As can be understood from the fact that the vector $d_{parallel}$ has the same form as the vector $d_{series}$, the sensor controller 31 even in the present embodiment can separately acquire the levels $E_{m,\,n-1}$ to $E_{m,\,n+1}$ of the pen signals received in the respective loop coils $LCX_{n-1}$ to $LCx_{n+1}$, by multiplying the vector $d_{parallel}$ by the inverse matrix $F^{-1}$ of the matrix F. Therefore, according to the reception method of the pen signal according to the present embodiment, it can be said that the S/N ratio of the pen signal received in the sensor controller 31 can be improved without decreasing the frequency of position detection and without increasing the circuit scale of the sensor controller 31. However, in the case where the plurality of loop coils LCx are connected in parallel, the inductance becomes small as compared with the case where they are connected in series, and thus, in the present embodiment, the levels of the pen signals become small as compared with those in the first embodiment. Therefore, it can be said that the effect of improving the S/N ratio of the pen signal is higher in the first embodiment than in the present embodiment.

Next, a position detection system 1 according to a third embodiment of the present invention will be described.

Figure 14:
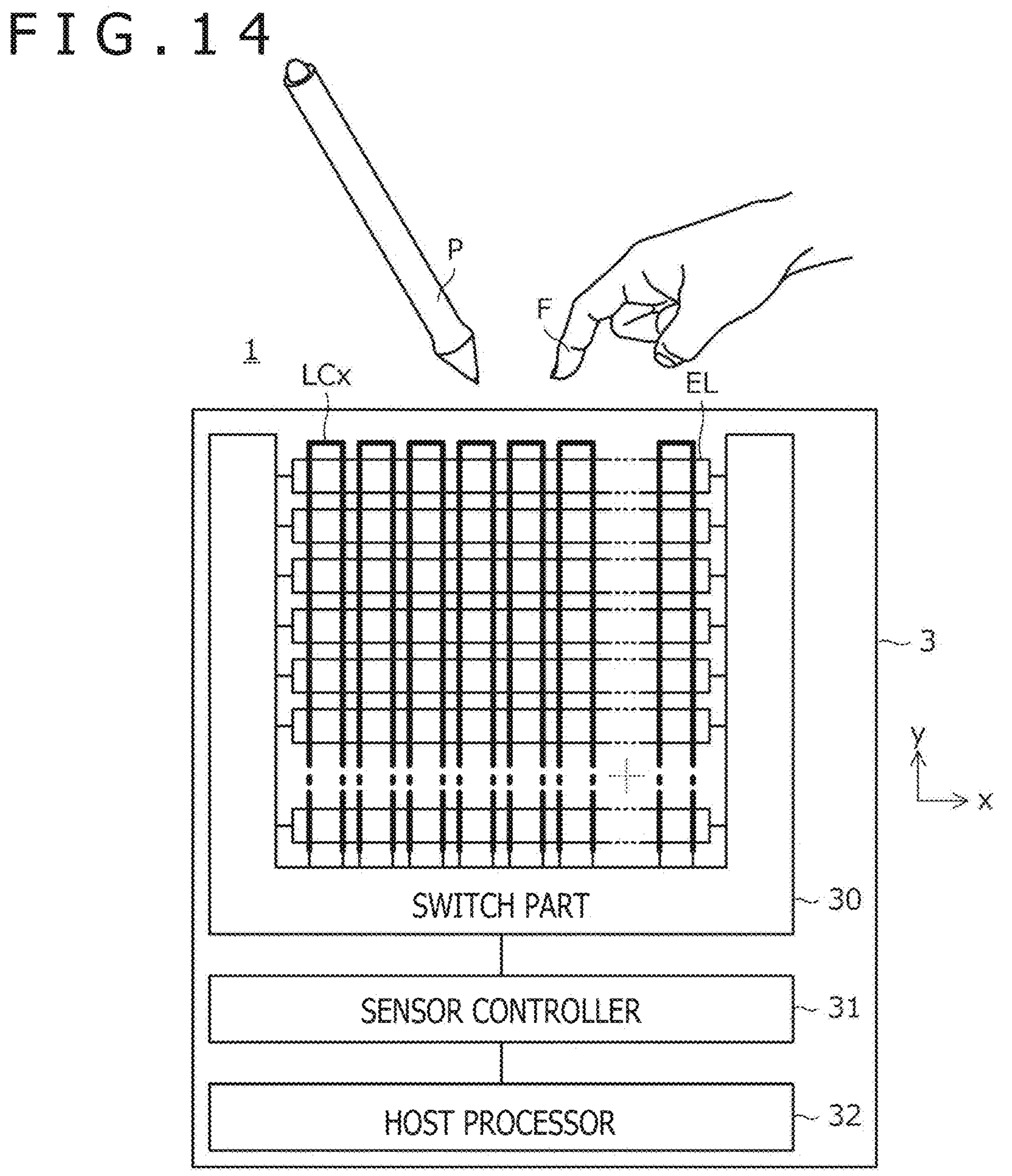
FIG. 14 is a diagram depicting a configuration of a position detection system 1 according to a third embodiment of the present invention.

FIG. 14 is a diagram depicting a configuration of the position detection system 1 according to the present embodiment. The position detection system 1 according to the present embodiment is different from the position detection system 1 according to the first embodiment in that a position detection device 3 also supports position detection of a finger F by the capacitance system, that the position detection device 3 has a plurality of linear electrodes EL instead of the plurality of loop coils LCy, and the internal configuration of a switch part 30. Since the position detection system 1 according to the present embodiment is similar to the position detection system 1 according to the first embodiment in other points, the description will be continued below by focusing on differences from the position detection system 1 according to the first embodiment.

The plurality of linear electrodes EL are formed to extend in the x direction and are arranged side by side in the y direction. Each of the linear electrodes EL is connected to the switch part 30 at both ends.

The switch part 30 according to the present embodiment is an aggregate of switches configured with a plurality of switches for switching the mutual connection between the plurality of loop coils LCx and for switching the connection between the plurality of loop coils LCx and the plurality of linear electrodes EL on one hand and the sensor controller 31 on the other hand.

Figure 15:
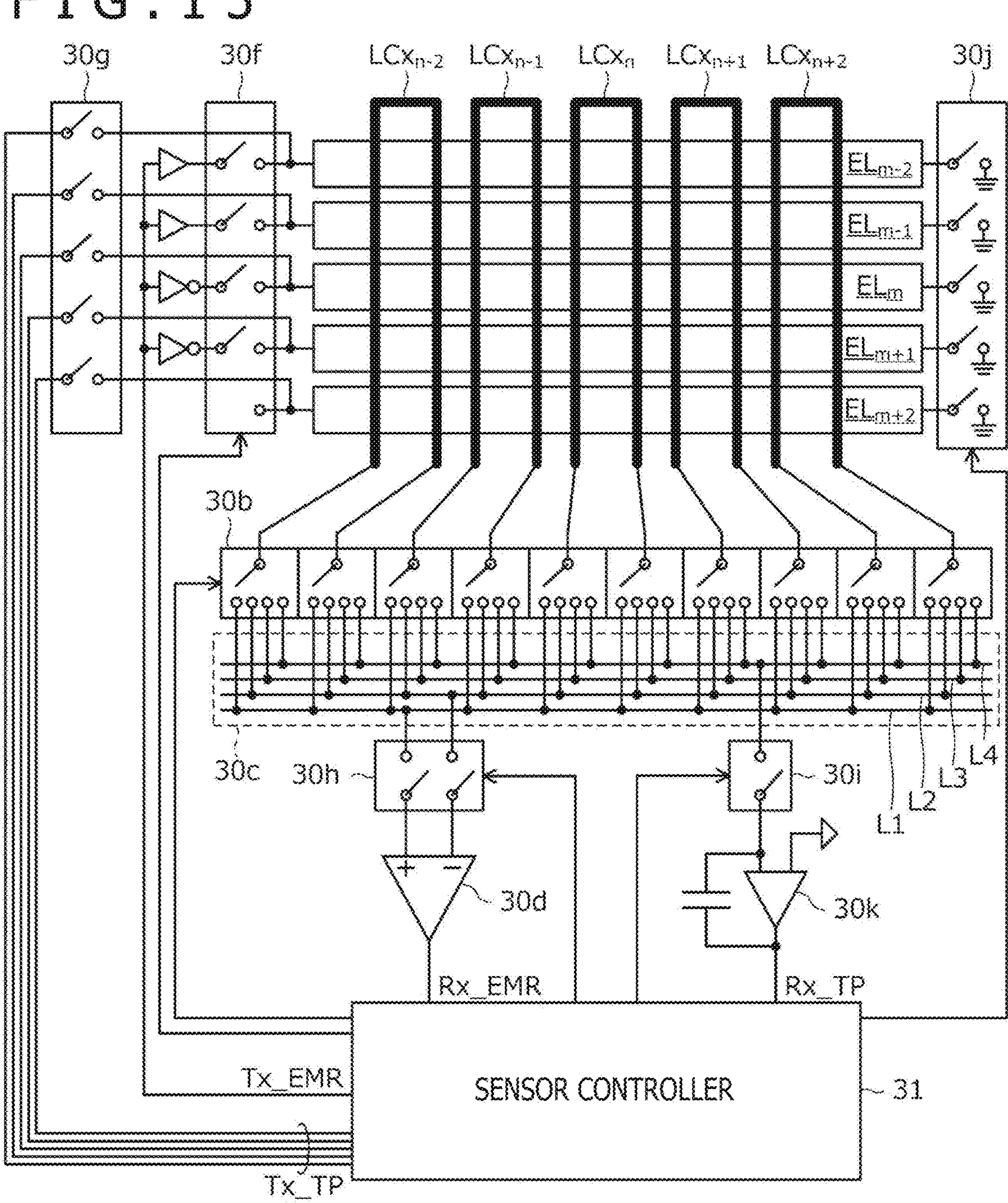
FIG. 15 is a diagram depicting an internal configuration of the switch part 30 depicted in FIG. 14.

FIG. 15 is a diagram depicting an internal configuration of the switch part 30 according to the present embodiment. As with FIG. 2, for simplicity, only five loop coils LCx and five linear electrodes EL (loop coils $LCx_{n-2}$ to $LCx_{n+2}$ and linear electrodes $EL_{m-2}$ to $EL_{m+2}$) are illustrated in the drawing. As depicted in the drawing, the switch part 30 according to the present embodiment includes switches 30*f* to 30*j* and an operational amplifier 30*k* in addition to the switch 30*b*, the wiring part 30*c*, and the differential amplifier 30*d*. The switch 30*a* depicted in FIG. 2 is not included in the switch part 30 according to the present embodiment.

The switch 30*f* is configured to supply an alternating current Tx_EMR for generating an alternating magnetic field on the touch surface to the plurality of linear electrodes EL and has two input pins to which the alternating current Tx_EMR is supplied from the sensor controller 31, two input pins to which a current obtained by inverting the phase of the alternating current Tx_EMR is supplied, and an output pin provided for each linear electrode EL. Each output pin is connected to one end of the corresponding linear electrode EL in the x direction (longitudinal direction). The switch 30*f* serves to connect each input pin to any of the output pins according to the control of the sensor controller 31.

The switch 30*g* is configured to supply a touch detection signal Tx_TP for detecting the position of the finger F to the plurality of linear electrodes EL and has a set of an input pin and an output pin provided for each linear electrode EL. Each input pin is supplied with the touch detection signal Tx_TP from the sensor controller 31. Each output pin is connected to one end of the corresponding linear electrode EL in the x direction. The switch 30*g* serves to connect each input pin to the corresponding output pin according to the control of the sensor controller 31.

The switch 30*j* is configured to switch the other end of each linear electrode EL in the x direction (longitudinal direction) between a grounded state and a floating state in which the other end is not connected to anywhere. Each input pin of the switch 30*j* is connected to the other end of the corresponding linear electrode EL in the x direction (longitudinal direction). Meanwhile, each ground pin of the switch 30*j* is connected to a ground terminal to which the ground potential is supplied. The switch 30*j* is provided because, when the sensor controller 31 detects the position of the electromagnetic induction pen P, it is preferable to set the other end of each linear electrode EL in the x direction to the ground potential as described above, while, when the sensor controller 31 detects the position of the finger F, it is necessary to set the other end of each linear electrode EL in the x direction to the floating state. The switch 30*j* serves to switch the connection state between each input pin and the corresponding ground pin according to the control of the sensor controller 31.

The switches 30*b*, 30*h*, and 30*i* and the wiring part 30*c* are configured to supply a pen signal (transmitted by the electromagnetic induction pen P according to the alternating magnetic field) received by each loop coil LCx to the differential amplifier 30*d*, and to supply the touch detection signal Tx_TP received by each loop coil LCx to the operational amplifier 30*k*. The specific configurations of the switch 30*b* and the wiring part 30*c* among them are similar to those in the first embodiment.

The switch 30*h* is a switch that connects the wiring L1 to the non-inverting input terminal of the differential amplifier 30*d* and connects the wiring L2 to the inverting input terminal of the differential amplifier 30*d* according to the control of the sensor controller 31. The switch 30*i* is a switch that connects the wiring L4 to an input terminal of the operational amplifier 30*k* according to the control of the sensor controller 31. Initial states of the switches 30*h* and 30*i* are both off (disconnected state).

The differential amplifier 30*d* is the same as the differential amplifier 30*d* described in the first embodiment. However, in the present embodiment, a signal generated by the differential amplifier 30*d* is referred to as a received signal Rx_EMR. The operational amplifier 30*k* is a circuit for generating a received signal Rx_TP of the capacitance system by amplifying a voltage difference between the input terminal and a ground terminal, and configures a reception circuit of the touch detection signal Tx_TP together with the sensor controller 31. The input terminal of the operational amplifier 30*k* is connected to the wiring L4 of the wiring part 30*c* via the switch 30*i*, and thus, the received signal Rx_TP becomes a signal obtained by amplifying the signal appearing on the wiring L4. The operational amplifier 30*k* is provided with a parallel capacitor for eliminating high-frequency noise. Both the received signal Rx_EMR generated by the differential amplifier 30*d* and the received signal Rx_TP generated by the operational amplifier 30*k* are supplied to the sensor controller 31.

With reference back to FIG. 14, the sensor controller 31 according to the present embodiment has a function of detecting the position of the finger F on the touch surface by the capacitance system, in addition to the function (the function of detecting the position of the electromagnetic induction pen P in the touch surface by the EMR system and acquiring data transmitted by the electromagnetic induction pen P, by demodulating the pen signal transmitted by the electromagnetic induction pen P) described in the first embodiment. The detection of the position of the electromagnetic induction pen P, the acquisition of the data from the electromagnetic induction pen P, and the detection of the position of the finger F are executed in time division. The sensor controller 31 is configured to sequentially supply the detected position and the acquired data to the host processor 32. The process performed by the host processor 32 receiving the supply is similar to that in the first embodiment.

Hereinafter, a process of detecting the positions of the electromagnetic induction pen P and the finger F performed by the sensor controller 31 will specifically be described with reference to FIG. 16 to FIG. 19.

Figure 16:
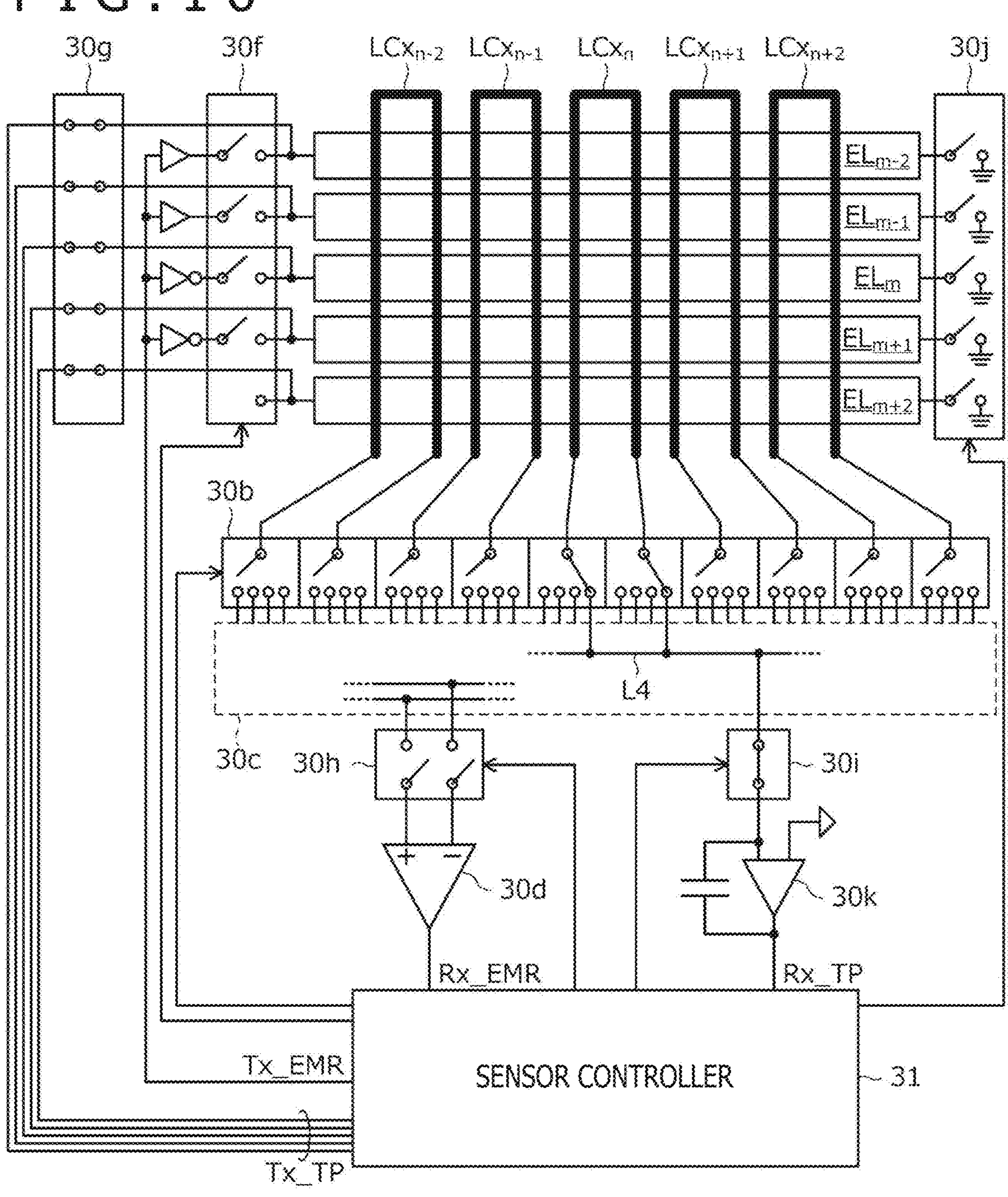
FIG. 16 is a diagram depicting a state of the switch part 30 in a case where the sensor controller 31 detects the position of a finger F.

First, FIG. 16 is a diagram depicting a state of the switch part 30 in the case where the sensor controller 31 according to the present embodiment detects the position of the finger F. As depicted in the drawing, the sensor controller 31 in this case controls the switch 30*b* such that each input pin is connected to the corresponding output pin. Accordingly, the touch detection signal Tx_TP is supplied from the sensor controller 31 to one end of each linear electrode EL in the x direction. In addition, the sensor controller 31 controls the switch 30*j* such that each input pin is separated from the corresponding ground pin, so that the other end of each linear electrode EL in the x direction is brought into the floating state.

Specific contents of the touch detection signal Tx_TP generated by the sensor controller 31 can be represented by a matrix A (second matrix) depicted in the following equation (12). The matrix A is a square matrix having a plurality of rows corresponding to the plurality of linear electrodes EL in a one-to-one manner, and the left side of a subscript attached to each element ($A_{11}$ or the like) of the matrix A indicates an output order from the sensor controller 31, and the right side thereof indicates a serial number of the linear electrode EL. M is the total number of linear electrodes EL. The specific value of each element is either 1 or −1. The matrix A is preferably an orthogonal matrix, but it is not necessary to be an orthogonal matrix.

Math. 12

$$A = \begin{pmatrix} A_{11} & A_{21} & A_{31} & \cdots & A_{M1} \\ A_{12} & A_{22} & A_{32} & \cdots & A_{M2} \\ A_{13} & A_{23} & A_{33} & \cdots & A_{M3} \\ \vdots & \vdots & \vdots & \cdots & \vdots \\ A_{1M} & A_{2M} & A_{3M} & \cdots & A_{MM} \end{pmatrix} \quad (12)$$

The sensor controller 31 generates the touch detection signal Tx_TP for each column of the matrix A and supplies it to each linear electrode EL. The touch detection signal Tx_TP according to a typical example is a binary pulse signal that is high in the case where the corresponding element of the matrix A is 1 and that is low in the case where it is 1. Hereinafter, the touch detection signal Tx_TP corresponding to one column of the matrix A is referred to as a "partial touch detection signal Tx_TP."

While one partial touch detection signal Tx_TP is supplied to each linear electrode EL, the sensor controller 31 performs a process of connecting each loop coil LCx to the operational amplifier 30$k$ in order while maintaining the switch 30$i$ in a connected state. Specifically, the switch 30$b$ is controlled such that each loop coil LCx is connected to the wiring L4 at both ends in order. It should be noted that FIG. 16 depicts an example in the case where the loop coils $LCx_n$ are connected to the wiring L4.

Here, if it is assumed that the capacitance formed between the m-th linear electrode $EL_m$ and the n-th loop coil $LCx_n$ is $C_{mn}$, when the partial touch detection signal Tx_TP corresponding to the x-th column of the matrix A is supplied to each linear electrode EL and the n-th loop coil $LCx_n$ is connected to the operational amplifier 30$k$, the received signal Rx_TP supplied from the operational amplifier 30$k$ to the sensor controller 31 has a value depicted by the following equation (13).

Math. 13

$$\begin{pmatrix} A_{x1} & A_{x2} & A_{x3} & \cdots & A_{xM} \end{pmatrix} \begin{pmatrix} C_{1n} \\ C_{2n} \\ C_{3n} \\ \vdots \\ C_{Mn} \end{pmatrix} \quad (13)$$

Therefore, the received signal Rx_TP obtained for the n-th loop coil $LCx_n$ during the supply of the partial touch detection signal Tx_TP corresponding to each column of the matrix A is represented by a vector b depicted in the following equation (14) as a whole. It should be noted that $A^T$ in the equation (14) is a transposed matrix of matrix A.

Math. 14

$$b = A^T \begin{pmatrix} C_{1n} \\ C_{2n} \\ C_{3n} \\ \vdots \\ C_{Mn} \end{pmatrix} \quad (14)$$

The sensor controller 31 separately acquires the capacitance $C_{mn}$ for each linear electrode EL by performing an operation depicted in the left side of the following equation (15) on the vector b. It should be noted that a matrix $(A^T)^{-1}$ depicted in the equation (15) is an inverse matrix of the matrix $A^T$. Since the unit matrix I is obtained by multiplying the matrix $A^T$ by the matrix $(A^T)^{-1}$ as depicted also in the equation (15), the sensor controller 31 performs this operation to make it possible to separately acquire the capacitance $C_{mn}$ of an intersection point between the n-th loop coil $LCx_n$ and each linear electrode $EL_m$ as depicted in the right side of the equation (15).

Math. 15

$$(A^T)^{-1} b = (A^T)^{-1} A^T \begin{pmatrix} C_{1n} \\ C_{2n} \\ C_{3n} \\ \vdots \\ C_{Mn} \end{pmatrix} = I \begin{pmatrix} C_{1n} \\ C_{2n} \\ C_{3n} \\ \vdots \\ C_{Mn} \end{pmatrix} = \begin{pmatrix} C_{1n} \\ C_{2n} \\ C_{3n} \\ \vdots \\ C_{Mn} \end{pmatrix} \quad (15)$$

The sensor controller 31 derives the capacitance $C_{mn}$ for each intersection point between the linear electrode EL and the loop coil LCx by executing an operation similar to the equation (15) for each loop coil LCx. Then, the sensor controller 31 derives the position of the finger F on the basis of a distribution of the derived capacitances $C_{mn}$ in the touch surface. Specifically, a position corresponding to an apex of the distribution may be derived as the position of the finger F as with the position detection of the electromagnetic induction pen P by the EMR system.

Figure 17:
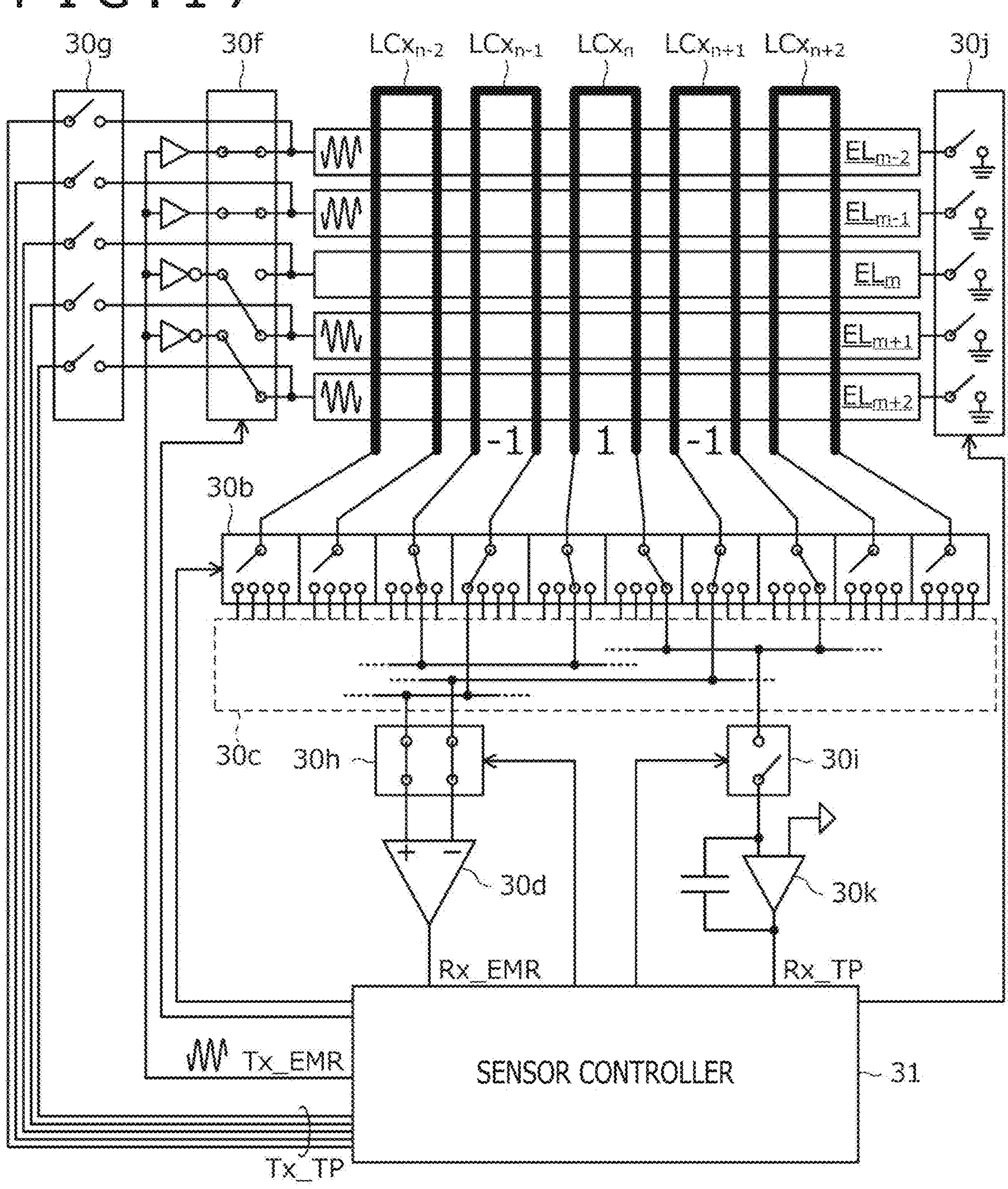
FIG. 17 is a diagram depicting a state of the switch part 30 in a case where the sensor controller 31 detects the position of the electromagnetic induction pen P.
Figure 18:
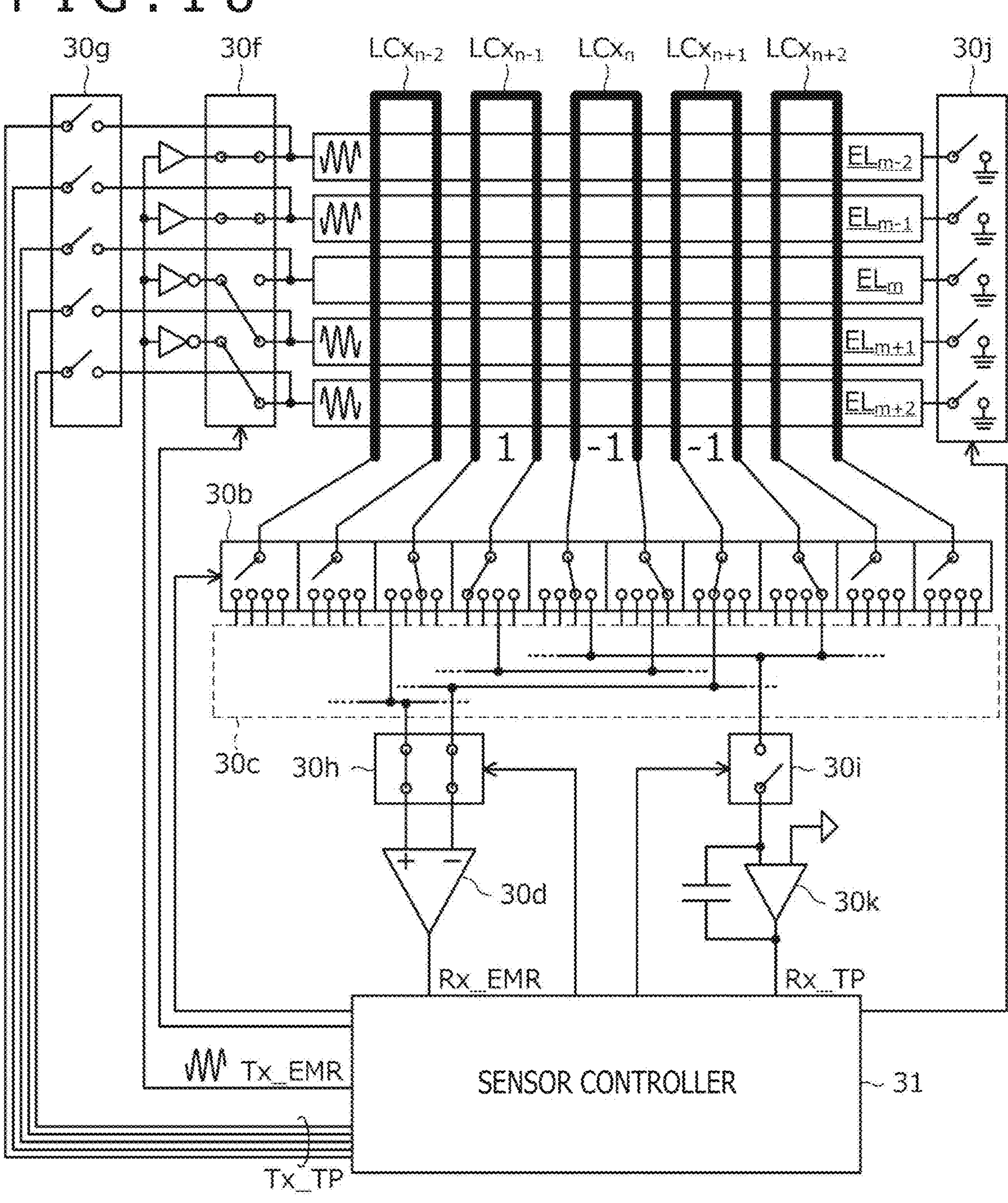
FIG. 18 is a diagram depicting a state of the switch part 30 in the case where the sensor controller 31 detects the position of the electromagnetic induction pen P.
Figure 19:
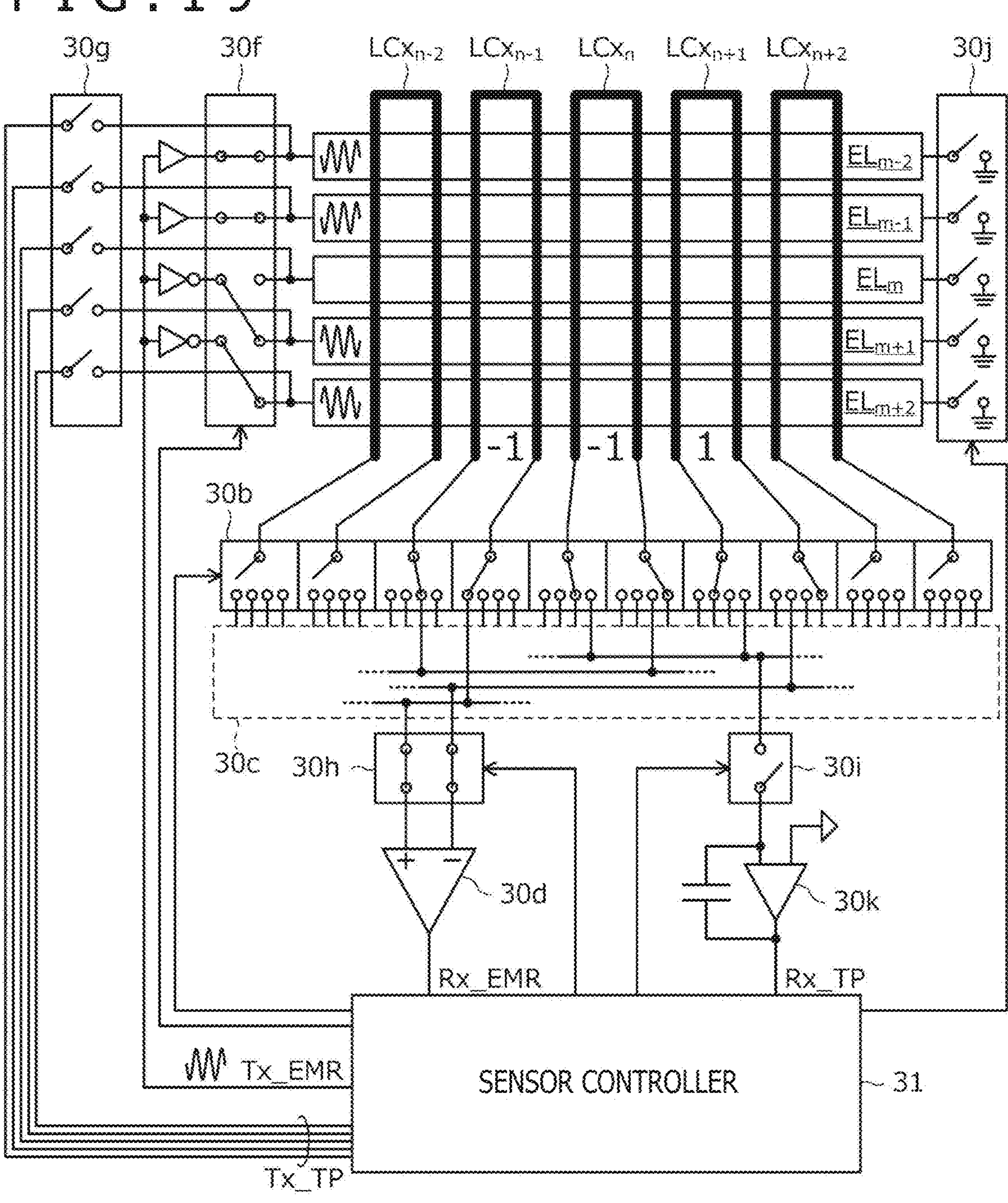
FIG. 19 is a diagram depicting a state of the switch part 30 in the case where the sensor controller 31 detects the position of the electromagnetic induction pen P.

Next, FIG. 17 to FIG. 19 are diagrams each depicting a state of the switch part 30 in the case where the sensor controller 31 according to the present embodiment detects the position of the electromagnetic induction pen P. As depicted in the drawings, the sensor controller 31 according to the present embodiment controls the switch 30$f$ such that the alternating current Tx_EMR is supplied to the two linear electrodes $EL_{m-1}$ and $EL_{m-2}$ adjacent on one side with respect to one linear electrode $El_m$, and the inverted signal of the alternating current Tx_EMR is supplied to the two linear electrodes $EL_{m+1}$ and $EL_{m+2}$ adjacent on the other side. In addition, the sensor controller 31 controls the switch 30$j$ such that each input pin is connected to the corresponding ground pin, and thus, the other end of each linear electrode EL in the x direction is brought into the grounded state.

Under this control, a pseudo coil centered on the linear electrode $EL_m$ is formed, and an alternating magnetic field is generated on the touch surface (particularly, above the linear electrode $EL_m$). Hereinafter, generating an alternating magnetic field in this manner is referred to as "sending an alternating magnetic field from the linear electrode $EL_m$." The sensor controller 31 is configured to sequentially send similar alternating magnetic fields from the linear electrodes EL by executing a similar process by setting each linear electrode EL other than the four linear electrodes EL positioned at both ends of all the linear electrodes EL, as the linear electrode $EL_m$ in order.

It should be noted that, in order to detect the position of the electromagnetic induction pen P on the entire touch surface, it is preferable that the four linear electrodes EL, which are excluded from the execution of the above process, be arranged at positions outside the touch surface. In addition, in the present embodiment, the alternating current flows in two linear electrodes EL on each side of the linear electrode $EL_m$ that sends the alternating magnetic field, but the alternating current may flow in one linear electrode EL on each side or three or more linear electrodes EL on each side.

While the alternating magnetic field is sent from the linear electrode $EL_m$, the sensor controller 31 according to the present embodiment selects a set of three adjacent loop coils LCx as one set in order while maintaining the switch 30*h* in a connected state, and each time, performs a process of controlling the switch 30*b* such that the three loop coils LCx configuring the selected set are connected in series to the differential amplifier 30*d* in three connection modes having different connection polarities. This process is the same as the process of the sensor controller 31 described in the first embodiment, except that the control of the switch 30*h* is added. Therefore, the differential amplifier 30*d* detects a result value indicating the level of the pen signal on the basis of the potential between both ends of the composite coil including the three loop coils LCx connected in series, and outputs the result value to the sensor controller 31 as the received signal Rx_EMR as in the first embodiment.

FIG. 17 to FIG. 19 depict connections in the three connection modes described above. Specific contents of these connection modes are similar to those depicted in FIG. 5 to FIG. 7. The sensor controller 31 according to the present embodiment executes the above three connection modes in order while changing the linear electrode $EL_m$ that sends the alternating magnetic field, and performs a restoration operation similar to that in the first embodiment on the received signal Rx_EMR obtained as the result, so that the levels of the pen signals received by the respective loop coils LCx in the case where the alternating magnetic field is sent from each linear electrode $EL_m$ can be separately acquired. Therefore, according to the reception method of the pen signal according to the present embodiment, it can be said that the S/N ratio of the pen signal received in the sensor controller 31 can be improved without decreasing the frequency of position detection and without increasing the circuit scale of the sensor controller 31.

In addition, according to the position detection system 1 according to the present embodiment, since a set of linear electrodes EL arranged side by side in the y direction and a set of loop coils LCx arranged side by side in the x direction can realize both the EMR sensor and the touch sensor (sensor for detecting a touch made by the finger F, by using the capacitance system), it is possible to realize weight reduction and cost reduction of the position detection device as compared with a case where the EMR sensor and the touch sensor are individually provided in one position detection device.

It is obvious that, also in the present embodiment, the loop coils LCx may be connected in parallel as described in the second embodiment.

Although the preferred embodiments of the present invention have been described above, it is obvious that the present invention is not limited to these embodiments in any way, and that the present invention can be carried out in various modes without departing from the gist thereof.

For example, in the first and third embodiments, an example of generating the received signal Rx (or the received signal Rx_EMR) on the basis of the potential between both ends of the composite coil including the three loop coils LCx connected in series has been described, and in the second embodiment, an example of generating the received signal Rx on the basis of the potential (potential with respect to the ground end) of one end of the composite coil including the three loop coils LCx connected in parallel has been described, but in the case where the three loop coils LCx are connected in series, the received signal Rx (or the received signal Rx_EMR) may be generated on the basis of the potential (potential with respect to the ground end) of one end of the composite coil including the three loop coils LCx, or in the case where the three loop coils LCx are connected in parallel, the received signal Rx (or the received signal Rx_EMR) may be generated on the basis of the potential between both ends of the composite coil including the three loop coils LCx.

In addition, in the first to third embodiments, an example of using three adjacent loop coils LCx as one set in order to detect the position of the electromagnetic induction pen P has been described, but two adjacent loop coils LCx may be used as one set, or four or more adjacent loop coils LCx may be used as one set. Alternatively, all the loop coils LCx may be used as one set. In a case where n ($n \geq 2$) loop coils LCx are used as one set, the matrix F is an $n \times n$ matrix.

In addition, in the first to third embodiments, an example of generating the received signal Rx (or the received signal Rx_EMR) while changing the mutual connection modes of the plurality of loop coils LCx by using the switch 30*b* has been described, but the received signal Rx (or the received signal Rx_EMR) may be generated while changing the connection between each loop coil LCx and the operation circuit. For example, the loop coils $LCx_{n-1}$ and $LCx_{n+1}$ may be connected to a subtraction circuit and the loop coil $LCx_n$ may be connected to an addition circuit in the pen signal detection period T1 depicted in FIG. 6, the loop coils $LCx_n$ and $LCx_{n+1}$ may be connected to the subtraction circuit and the loop coil $LCX_{n-1}$ may be connected to the addition circuit in the pen signal detection period T2, and the loop coil $LCx_n$ may be connected to the subtraction circuit and the loop coils $LCX_{n-1}$ and $LCx_{n+1}$ may be connected to the addition circuit in the pen signal detection period T3.

In addition, the technique of the present invention may be applied to generate the received signal Rx (or the received signal Rx_EMR) according to any connection mode of the loop coils LCx. For example, a difference $E_{m,1}-E_{m,2}$ between the loop coil $LCx_1$ and the loop coil $LCx_2$, or a signal $(E_{m,1}+E_{m,2})-(E_{m,3}+E_{m,4})$ obtained by subtracting the addition signal of the loop coil $LCx_3$ and the loop coil $LCx_4$ from the addition signal of the loop coil $LCx_1$ and the loop coil $LCx_2$ may be generated. In this way, it is possible to acquire the level of the pen signal according to any connection mode of the loop coils LCx.

DESCRIPTION OF REFERENCE SYMBOLS

1: Position detection system
3: Position detection device
30: Switch part
30*a*, 30*b*, 30*f* to 30*j*: Switch
30*c*: Wiring part
30*d*: Differential amplifier
30*e*, 30*k*: Operational amplifier
31: Sensor controller
32: Host processor
EL: Linear electrode
F: Finger
L1 to L4: Wiring
LCx, LCy: Loop coil
P: Electromagnetic induction pen
T1 to T3: Pen signal detection period
Tx, Tx_EMR: Alternating current
Tx_TP: Touch detection signal
Rx, Rx_EMR: Received signal
Rx_TP: Received signal

The invention claimed is:

1. A position detection device comprising:

a plurality of linear electrodes that are formed to extend in a first direction and are arranged side by side in a second direction different from the first direction;

a plurality of coils that are formed to extend in the second direction and are arranged side by side in the first direction; and a sensor controller configured to:

in a first half of each of a plurality of pen signal detection periods, send an alternating magnetic field by supplying a first alternating current to one or more of the plurality of linear electrodes and by supplying a second alternating current different from the first alternating current to one or more others of the plurality of linear electrodes;

in a second half of each of the plurality of pen signal detection periods, connect a defined number of two or more coils selected from the plurality of coils in connection modes having different connection polarities in the plurality of pen signal detection periods and detect a result value indicating a level of a pen signal via the defined number of two or more coils; and separately acquire the level of the pen signal corresponding to each of the defined number of two or more coils by performing a restoration operation according to the connection polarities on a plurality of the result values detected in the plurality of pen signal detection periods.

2. The position detection device according to claim 1, wherein the second alternating current has a phase opposite to that of the first alternating current.

3. The position detection device according to claim 1, wherein in the connection modes the defined number of two or more coils are connected in series; and the sensor controller detects the result value on a basis of potential of at least one end of a composite coil including the defined number of two or more coils connected in series.

4. The position detection device according to claim 3, wherein the sensor controller detects the result value on a basis of a potential difference between both ends of the composite coil.

5. The position detection device according to claim 1, wherein in the connection modes the defined number of two or more coils are connected in parallel; and the sensor controller detects the result value on a basis of potential of at least one end of each of the defined number of two or more coils.

6. The position detection device according to claim 1, wherein the restoration operation is an operation based on an inverse matrix of a first matrix indicating the connection polarities in the plurality of pen signal detection periods.

7. The position detection device according to claim 1, wherein the defined number of two or more coils are adjacent to each other in the first direction.

8. The position detection device according to claim 7, wherein the sensor controller is configured to:

sequentially select, from the plurality of coils, sets of coils, wherein each of the sets includes the defined number of two or more coils that are adjacent to each other; and each time a set of coils is selected:

in the first half of each of the plurality of pen signal detection periods, send the alternating magnetic field by supplying the first alternating current to one or more of the plurality of linear electrodes and by supplying the second alternating current different from the first alternating current to one or more others of the plurality of linear electrodes;

in the second half of each of the plurality of pen signal detection periods, connect the defined number of two or more coils that form the selected set in the connection modes having different connection polarities in the plurality of pen signal detection periods and detect the result value indicating the level of the pen signal via the defined number of two or more coils; and separately acquire the level of the pen signal corresponding to each of the defined number of two or more coils that form the selected set by performing the restoration operation according to the connection polarities on the plurality of the result values detected in the plurality of pen signal detection periods.

9. The position detection device according to claim 1, wherein the plurality of coils are connected, at least at one end each thereof, to a switch; and the sensor controller switches the connection modes of the defined number of two or more coils by controlling a connected state of the switch.

10. The position detection device according to claim 9, wherein the switch is provided in a circuit substrate or an integrated circuit.

11. The position detection device according to claim 10, wherein the switch includes a plurality of input pins; and the one end each of the plurality of coils is connected to one of the plurality of input pins.

12. The position detection device according to claim 9, wherein the plurality of coils are each connected to the switch at both ends thereof.

13. The position detection device according to claim 1, wherein the sensor controller is configured to:

in a touch detection period different from the plurality of pen signal detection periods, supply touch detection signals based on a second matrix to the plurality of linear electrodes and sequentially receive the touch detection signals at the plurality of coils; and separately acquire a level of the touch detection signal corresponding to each of the plurality of coils by performing an operation based on an inverse matrix of the second matrix on the touch detection signals received at the plurality of coils.

14. The position detection device according to claim 13, wherein the second matrix is a square matrix having a plurality of rows corresponding to the plurality of linear electrodes in a one-to-one manner.

15. A sensor controller connected to:

a plurality of linear electrodes that are formed to extend in a first direction and are arranged side by side in a second direction different from the first direction; and a plurality of coils that are formed to extend in the second direction and are arranged side by side in the first direction;

wherein the sensor controller is configured to:

in a first half of each of a plurality of pen signal detection periods, send an alternating magnetic field by supplying a first alternating current to one or more of the plurality of linear electrodes and by supplying a second alternating current different from the first alternating current to one or more others of the plurality of linear electrodes; and in a second half of each of the plurality of pen signal detection periods, connect a defined number of two or more coils selected from the plurality of coils in connection modes having different connection polarities in the plurality of pen signal detection periods and detect a result value indicating a level of a pen signal via the defined number of two or more coils; and separately acquire the level of the pen signal corresponding to each of the defined number of two or more coils by performing a restoration operation according to the connection polarities on a plurality of the result values detected in the plurality of pen signal detection periods.

16. A method of receiving a pen signal from a pen using:

a plurality of linear electrodes that are formed to extend in a first direction and are arranged side by side in a second direction different from the first direction; and a plurality of coils that are formed to extend in the second direction and are arranged side by side in the first direction;

wherein the method comprises:

in a first half of each of a plurality of pen signal detection periods, sending an alternating magnetic field by supplying a first alternating current to one or more of the plurality of linear electrodes and by supplying a second alternating current different from the first alternating current to one or more others of the plurality of linear electrodes; and in a second half of each of the plurality of pen signal detection periods, connecting a defined number of two or more coils selected from the plurality of coils in connection modes having different connection polarities in the plurality of pen signal detection periods and detecting a result value indicating a level of a pen signal via the defined number of two or more coils; and separately acquiring the level of the pen signal corresponding to each of the defined number of two or more coils by performing a restoration operation according to the connection polarities on a plurality of the result values detected in the plurality of pen signal detection periods.

* * * * *